(12) United States Patent
Jiang et al.

(10) Patent No.: US 12,302,158 B2
(45) Date of Patent: May 13, 2025

(54) SPATIAL METRIC BASED MOBILITY PROCEDURES USING MULTI-PORT MOBILITY REFERENCE SIGNALS

(71) Applicant: QUALCOMM Incorporated, San Diego, CA (US)

(72) Inventors: Jing Jiang, San Diego, CA (US); Jae Won Yoo, San Diego, CA (US); Yongle Wu, San Diego, CA (US); Lei Xiao, San Jose, CA (US); Hari Sankar, San Diego, CA (US); Alexei Yurievitch Gorokhov, San Diego, CA (US); Yu Zhang, San Diego, CA (US); Wei Yang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/903,834

(22) Filed: Sep. 6, 2022

(65) Prior Publication Data

US 2024/0080692 A1  Mar. 7, 2024

(51) Int. Cl.
*H04W 24/10* (2009.01)
*H04L 5/00* (2006.01)

(52) U.S. Cl.
CPC ............ *H04W 24/10* (2013.01); *H04L 5/0051* (2013.01)

(58) Field of Classification Search
CPC .................................................... H04W 24/10
See application file for complete search history.

(56) References Cited

U.S. PATENT DOCUMENTS 10,886,956 B2   1/2021  Lee et al.
2013/0308715 A1  11/2013  Nam et al.
(Continued)

FOREIGN PATENT DOCUMENTS

EP        3585117 A1    12/2019
WO    WO-2019031096 A1   2/2019
WO    WO-2022073154 A1 *  4/2022  ............. H04B 7/024

OTHER PUBLICATIONS

International Search Report and Written Opinion—PCT/US2023/031255—ISA/EPO—Dec. 18, 2023.

*Primary Examiner* — Michael A Keller
(74) *Attorney, Agent, or Firm* — Holland & Hart LLP

(57) ABSTRACT

Methods, systems, and devices for wireless communications are described. In some wireless communications systems, a user equipment (UE) and a network entity may utilize multi-port mobility reference signals to assist with spatial based mobility procedures. The UE may receive a reference signal that is associated with multiple antenna ports. The UE may measure a multi-dimensional channel response based on the reference signal. The multi-dimensional channel response may be associated with measured channel metrics corresponding to the multiple antenna ports. The UE may transmit a report that includes a channel measurement vector based on the multi-dimensional channel response. The channel measurement vector may indicate multiple measured channel metrics for one or more dimensions of the multi-dimensional channel response. The network entity may transmit a message that indicates one or more metrics associated with mobility management for the UE based on the report that indicates the channel measurement vector.

30 Claims, 17 Drawing Sheets

(56) References Cited

U.S. PATENT DOCUMENTS

| | | |
|---|---|---|
| 2017/0331535 A1 | 11/2017 | Wei et al. |
| 2018/0220406 A1* | 8/2018 | Mizusawa ................ H04B 7/04 |
| 2019/0327056 A1 | 10/2019 | Chen et al. |
| 2022/0116801 A1* | 4/2022 | Dallal .................. H04B 17/336 |
| 2023/0216565 A1 | 7/2023 | Kwak et al. |
| 2024/0089047 A1 | 3/2024 | Yoo et al. |

* cited by examiner

SPATIAL METRIC BASED MOBILITY PROCEDURES USING MULTI-PORT MOBILITY REFERENCE SIGNALS

FIELD OF TECHNOLOGY

The following relates to wireless communications, including spatial metric based mobility procedures using multi-port mobility reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may receive reference signals from a network entity. The UE may report a signal strength of the reference signals to the network entity. The network entity may utilize the reported signal strengths to perform mobility management procedures for the UE, such as cell selection, beam selection, or both.

SUMMARY

The described techniques relate to improved methods, systems, devices, and apparatuses that support spatial metric based mobility procedures using multi-port mobility reference signals. For example, the described techniques provide for a user equipment (UE) to measure multi-port reference signals and report channel measurements across multiple spatial dimensions, which may improve reliability of mobility management procedures. The UE may receive, from one or more network entities, a reference signal associated with multiple antenna ports (e.g., a multi-port reference signal). The UE may measure a multi-dimensional channel response of the reference signal. The multi-dimensional channel response may be associated with multiple measured channel metrics corresponding to the multiple antenna ports. In some aspects, the UE may measure a channel response of the reference signal received from each antenna port, and the UE may concatenate the channel response to obtain the multi-dimensional channel response. The UE may decompose the multi-dimensional channel response into multiple dimensions. The UE may transmit a report to the network entity that includes a channel measurement vector. The channel measurement vector may indicate multiple measured channel metrics for one or more dimensions of the channel response based on decomposing the multi-dimensional channel response. The network entity may receive the channel measurement vector and determine one or more mobility management decisions (e.g., cell selection, beam selection) for the UE based on the channel measurements across multiple spatial dimensions. Additionally, or alternatively, the UE may determine the mobility management decisions autonomously based on the channel measurement vector. By performing mobility management procedures based on channel measurements as well as spatial information, the network entity and the UE may improve reliability and throughput of communications.

A method for wireless communications at a UE is described. The method may include receiving a reference signal associated with a set of multiple antenna ports, measuring, based on receiving the reference signal, a multi-dimensional channel response, the multi-dimensional channel response associated with a set of multiple measured channel metrics corresponding to the set of multiple antenna ports, and transmitting, based on measuring the multi-dimensional channel response, a report that includes a channel measurement vector indicating the set of multiple measured channel metrics for one or more dimensions of the multi-dimensional channel response.

An apparatus for wireless communications at a UE is described. The apparatus may include a processor, memory coupled with the processor, and instructions stored in the memory. The instructions may be executable by the processor to cause the apparatus to receive a reference signal associated with a set of multiple antenna ports, measure, based on receiving the reference signal, a multi-dimensional channel response, the multi-dimensional channel response associated with a set of multiple measured channel metrics corresponding to the set of multiple antenna ports, and transmit, based on measuring the multi-dimensional channel response, a report that includes a channel measurement vector indicating the set of multiple measured channel metrics for one or more dimensions of the multi-dimensional channel response.

Another apparatus for wireless communications at a UE is described. The apparatus may include means for receiving a reference signal associated with a set of multiple antenna ports, means for measuring, based on receiving the reference signal, a multi-dimensional channel response, the multi-dimensional channel response associated with a set of multiple measured channel metrics corresponding to the set of multiple antenna ports, and means for transmitting, based on measuring the multi-dimensional channel response, a report that includes a channel measurement vector indicating the set of multiple measured channel metrics for one or more dimensions of the multi-dimensional channel response.

A non-transitory computer-readable medium storing code for wireless communications at a UE is described. The code may include instructions executable by a processor to receive a reference signal associated with a set of multiple antenna ports, measure, based on receiving the reference signal, a multi-dimensional channel response, the multi-dimensional channel response associated with a set of multiple measured channel metrics corresponding to the set of multiple antenna ports, and transmit, based on measuring the multi-dimensional channel response, a report that includes a channel measurement vector indicating the set of multiple measured channel metrics for one or more dimensions of the multi-dimensional channel response.

In some examples of the method, apparatuses, and non-transitory computer-readable medium described herein, receiving the reference signal may include operations, features, means, or instructions for receiving the reference signal from the set of multiple antenna ports associated with a same cell identifier (ID) and a same beam ID, where the channel measurement vector indicates the set of multiple measured channel metrics associated with the same cell ID and the same beam ID.

In some examples of the method, apparatuses, and non-transitory computer-readable medium described herein, receiving the reference signal may include operations, features, means, or instructions for receiving the reference signal from the set of multiple antenna ports associated with two or more cell IDs, two or more beam IDs, or both, where the channel measurement vector indicates the set of multiple measured channel metrics associated with the two or more cell IDs, the two or more beam IDs, or both.

In some examples of the method, apparatuses, and non-transitory computer-readable medium described herein, measuring the multi-dimensional channel response may include operations, features, means, or instructions for measuring a respective channel response associated with each of the two or more cell IDs, associated with each of the two or more beam IDs, or both and concatenating the respective channel responses to obtain the multi-dimensional channel response.

Some examples of the method, apparatuses, and non-transitory computer-readable medium described herein may further include operations, features, means, or instructions for measuring the set of multiple channel metrics based on the multi-dimensional channel response and determining a subset of channel metrics of the set of multiple channel metrics associated with a subset of the one or more dimensions of the multi-dimensional channel response, the subset of channel metrics associated with a greatest metric value, where the channel measurement vector includes the subset of channel metrics based on the determining.

Some examples of the method, apparatuses, and non-transitory computer-readable medium described herein may further include operations, features, means, or instructions for receiving a signal that indicates the two or more cell IDs, the two or more beam IDs, or both support coherent joint transmissions or non-coherent joint transmissions for multi-port channel measurement.

Some examples of the method, apparatuses, and non-transitory computer-readable medium described herein may further include operations, features, means, or instructions for determining that the two or more cell IDs, the two or more beam IDs, or both support coherent joint transmissions or non-coherent joint transmissions for multi-port channel measurement based on values of the two or more cell IDs, the two or more beam IDs, or both.

Some examples of the method, apparatuses, and non-transitory computer-readable medium described herein may further include operations, features, means, or instructions for determining that the two or more cell IDs, the two or more beam IDs, or both support coherent joint transmissions or non-coherent joint transmissions for multi-port channel measurement based on a multiplexing mode associated with the reference signal.

In some examples of the method, apparatuses, and non-transitory computer-readable medium described herein, measuring the multi-dimensional channel response may include operations, features, means, or instructions for measuring a channel response vector associated with receiving the reference signal from the set of multiple antenna ports and performing a transformation of the channel response vector to obtain the one or more dimensions of the multi-dimensional channel response.

Some examples of the method, apparatuses, and non-transitory computer-readable medium described herein may further include operations, features, means, or instructions for determining whether the reference signal may be associated with beamforming across one or more subsets of antenna ports of the set of multiple antenna ports, where performing the transformation of the channel response vector may be based on the determining.

Some examples of the method, apparatuses, and non-transitory computer-readable medium described herein may further include operations, features, means, or instructions for whitening the channel response vector based on an interference covariance structure, where the channel response vector may be measured across multiple antennas that support with joint antenna processing.

Some examples of the method, apparatuses, and non-transitory computer-readable medium described herein may further include operations, features, means, or instructions for measuring the set of multiple measured channel metrics based on decomposing the channel response vector into the one or more dimensions.

In some examples of the method, apparatuses, and non-transitory computer-readable medium described herein, each measured channel metric of the set of multiple measured channel metrics in the channel measurement vector may be associated with a respective antenna port of the set of multiple antenna ports.

In some examples of the method, apparatuses, and non-transitory computer-readable medium described herein, each measured channel metric of the set of multiple measured channel metrics in the channel measurement vector may be associated with a respective set of two or more antenna ports of the set of multiple antenna ports.

Some examples of the method, apparatuses, and non-transitory computer-readable medium described herein may further include operations, features, means, or instructions for receiving a message that indicates one or more metrics associated with mobility management for the UE based on the report that indicates the channel measurement vector.

Some examples of the method, apparatuses, and non-transitory computer-readable medium described herein may further include operations, features, means, or instructions for determining one or more metrics associated with mobility management for the UE based on the report that indicates the channel measurement vector.

In some examples of the method, apparatuses, and non-transitory computer-readable medium described herein, receiving the reference signal may include operations, features, means, or instructions for receiving the reference signal from the set of multiple antenna ports based on frequency domain multiplexing across a set of multiple frequency combs, time domain multiplexing across a set of multiple symbols, delay domain multiplexing across a set of multiple cyclic shifts, code domain multiplexing, or non-orthogonal code division multiplexing.

In some examples of the method, apparatuses, and non-transitory computer-readable medium described herein, the set of multiple measured channel metrics include signal strength metrics, spectral efficiency metrics, rank metrics, a set of antenna ports of the set of multiple antenna ports that may be associated with each of the set of multiple measured channel metrics, or any combination thereof.

In some examples of the method, apparatuses, and non-transitory computer-readable medium described herein, the reference signal includes a synchronization signal block (SSB), a tracking reference signal (TRS), or a channel state information reference signal (CSI-RS).

A method for wireless communications at a network entity is described. The method may include transmitting a reference signal associated with a set of multiple antenna ports, receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal, and transmitting a message that indicates one or more metrics associated with mobility management for a UE in communication with the network entity based on the report that indicates the channel measurement vector.

An apparatus for wireless communications at a network entity is described. The apparatus may include a processor, memory coupled with the processor, and instructions stored in the memory. The instructions may be executable by the processor to cause the apparatus to transmit a reference signal associated with a set of multiple antenna ports, receive, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal, and transmit a message that indicates one or more metrics associated with mobility management for a UE in communication with the network entity based on the report that indicates the channel measurement vector.

Another apparatus for wireless communications at a network entity is described. The apparatus may include means for transmitting a reference signal associated with a set of multiple antenna ports, means for receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal, and means for transmitting a message that indicates one or more metrics associated with mobility management for a UE in communication with the network entity based on the report that indicates the channel measurement vector.

A non-transitory computer-readable medium storing code for wireless communications at a network entity is described. The code may include instructions executable by a processor to transmit a reference signal associated with a set of multiple antenna ports, receive, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal, and transmit a message that indicates one or more metrics associated with mobility management for a UE in communication with the network entity based on the report that indicates the channel measurement vector.

In some examples of the method, apparatuses, and non-transitory computer-readable medium described herein, transmitting the reference signal may include operations, features, means, or instructions for transmitting the reference signal from the set of multiple antenna ports of the network entity, the set of multiple antenna ports associated with a same cell ID and a same beam ID, where the channel measurement vector indicates the set of multiple measured channel metrics associated with the same cell ID and the same beam ID.

In some examples of the method, apparatuses, and non-transitory computer-readable medium described herein, transmitting the reference signal may include operations, features, means, or instructions for transmitting the reference signal from the set of multiple antenna ports, the set of multiple antenna ports associated with two or more cell IDs, two or more beam IDs, or both, where the channel measurement vector indicates the set of multiple measured channel metrics associated with the two or more cell IDs, the two or more beam IDs, or both.

Some examples of the method, apparatuses, and non-transitory computer-readable medium described herein may further include operations, features, means, or instructions for transmitting a signal that indicates the two or more cell IDs, the two or more beam IDs, or both support coherent joint transmissions or non-coherent joint transmissions for channel measurements.

In some examples of the method, apparatuses, and non-transitory computer-readable medium described herein, each measured channel metric of the set of multiple measured channel metrics in the channel measurement vector may be associated with a respective antenna port of the set of multiple antenna ports.

In some examples of the method, apparatuses, and non-transitory computer-readable medium described herein, each measured channel metric of the set of multiple measured channel metrics in the channel measurement vector may be associated with a respective set of two or more antenna ports of the set of multiple antenna ports.

In some examples of the method, apparatuses, and non-transitory computer-readable medium described herein, transmitting the reference signal may include operations, features, means, or instructions for transmitting, from the set of multiple antenna ports, the reference signal using frequency domain multiplexing across a set of multiple frequency combs, time domain multiplexing across a set of multiple symbols, delay domain multiplexing across a set of multiple cyclic shifts, code domain multiplexing, or non-orthogonal code division multiplexing.

In some examples of the method, apparatuses, and non-transitory computer-readable medium described herein, the set of multiple measured channel metrics include signal strength metrics, spectral efficiency metrics, rank metrics, or any combination thereof.

In some examples of the method, apparatuses, and non-transitory computer-readable medium described herein, the one or more metrics associated with the mobility management for the UE include a handover command for the UE.

DETAILED DESCRIPTION

Figure 1:
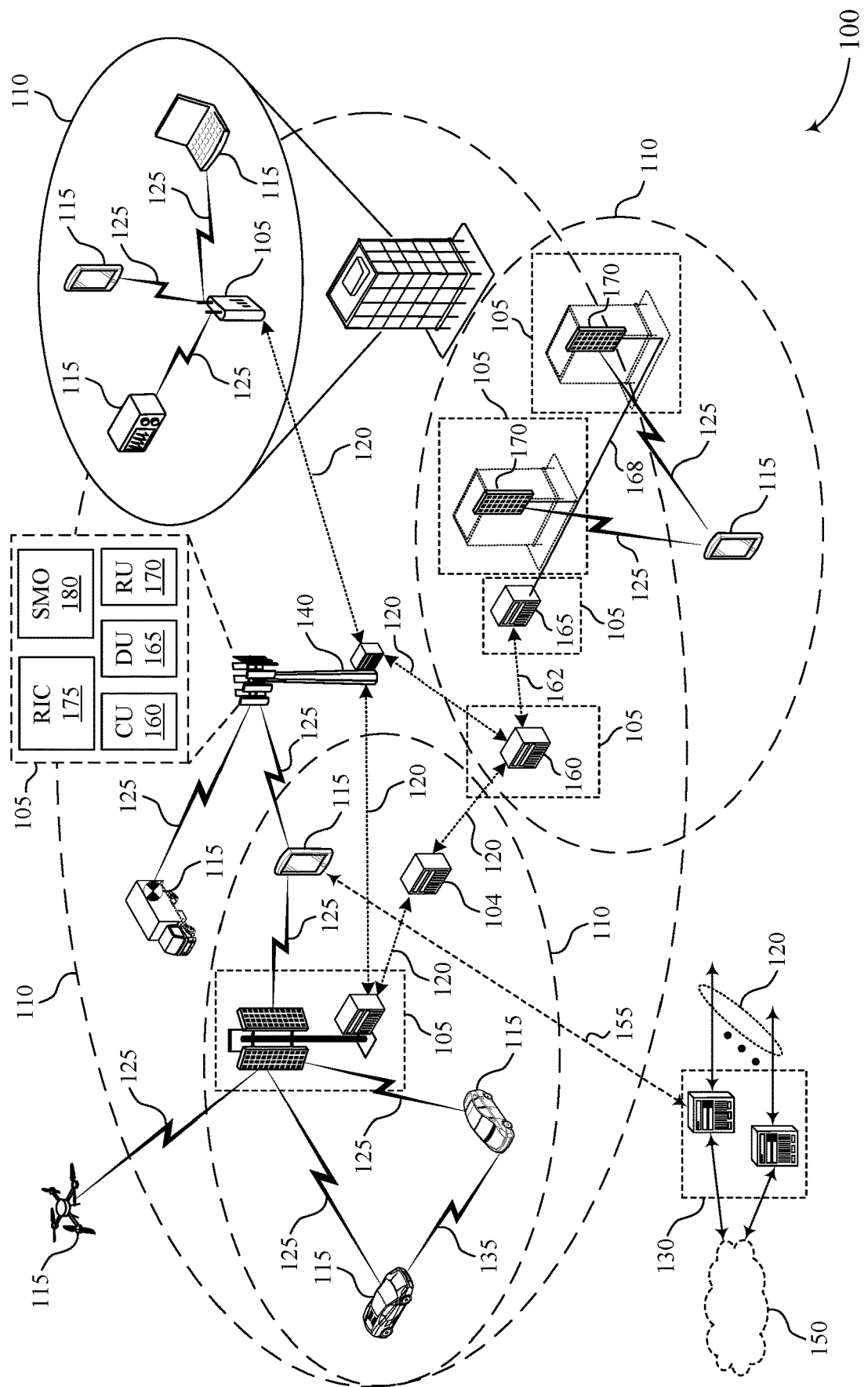
FIGS. 1-3 illustrate examples of wireless communications systems that support spatial metric based mobility procedures using multi-port mobility reference signals in accordance with one or more aspects of the present disclosure.

In some wireless communications systems, a user equipment (UE) and a network entity may perform a mobility management procedure associated with beam refinement, handovers of the UE between different cells or network entities, or both. The mobility management procedures may, in some cases, be based on signal strength measurements of reference signals transmitted by the network entity to the UE. For example, the network entity may transmit, to the UE, multiple reference signals each associated with a respective beam (e.g., a beam sweep). The UE may receive the reference signals and measure a signal strength (e.g., reference signal received power (RSRP)) of each reference signal. Each reference signal may be associated with a respective cell identifier (ID) based on the network entity and a respective beam ID based on the beam used to transmit the reference signal. The UE may determine signal strength measurement for each cell ID and each beam ID. The UE may transmit a report to the network entity to indicate one or more of the strongest cells and beam directions, and the network entity may perform mobility management procedures based on the indicated cells and beams (e.g., handover the UE to a cell associated with a strongest signal strength or switch to a beam associated with a strongest signal strength, or both). However, the reported signal strength measurements may not account for rank information or other spatial metrics associated with the cells and beam directions (e.g., a beam selected based on RSRP may have relatively poor rank condition, in some cases). Thus, cell and beam selection based only on signal strength measurements may reduce throughput and reliability of communications, in some aspects.

Techniques, systems, and devices described herein provide for a UE to receive multi-port reference signals for mobility procedures (e.g., multi-port mobility reference signals) and transmit a report including vectorized channel metrics associated with the multi-port reference signals (e.g., multi-dimensional information). The multi-port reference signals may be transmitted to the UE from the multiple different antenna ports at the same time (e.g., jointly or coherently). The antenna ports may be physical antenna ports each associated with a respective polarization. The antenna ports may be at a same antenna panel (e.g., ports associated with different polarizations) or at different antenna panels (e.g., across one or more remote radio heads (RRHs)). The UE may observe, for each reference signal, a channel response of the reference signal over the multiple antenna ports (e.g., a vector or matrix).

The UE may decompose the channel response vector into a quantity of dimensions associated with the antenna ports. The UE may measure channel metrics, such as signal strength measurements, rank information, spectral efficiency information, or any combination thereof, associated with one or more of the dimensions. The UE may transmit a report to the network entity that indicates a channel measurement vector including the measured channel metrics associated with the multiple spatial dimensions. For example, the channel measurement vector may include measurements associated with transmissions from one or more (e.g., any combination of) the multiple antenna ports. The network entity, the UE, or both may thereby make mobility handover decisions (e.g., beam or cell selections) based on the reported signal strength metrics as well as spatial metrics, such as rank, which may improve throughput and reliability of wireless communications.

In some systems, such as some cell-free multiple-input multiple-output (MIMO) systems, the reference signals may be transmitted from multiple antenna ports that are associated with different cells, different beam directions, or both. For example, a multi-port mobility reference signal may be transmitted at the same time (e.g., jointly) from a first antenna port at a first antenna panel associated with a first cell ID and a second antenna port at a second antenna panel associated with a second cell ID. In such cases, the UE may concatenate a channel responses for the reference signal associated with the first cell ID and the second cell ID. The UE may decompose the concatenated channel response into multiple dimensions and obtain measurements of channel metrics associated with each dimension. The UE may transmit a report to indicate a channel measurement vector including the measured channel metrics associated with the reference signal across the multiple dimensions. The UE and the network entity may thereby utilize multi-port mobility reference signals to perform multi-dimensional channel measurements. By making mobility management decisions for the UE based on the multi-dimensional channel measurements, the devices may account for spatial metrics, such as rank information, in addition to signal strength measurements, which may improve reliability and throughput of communications, among other advantages.

Aspects of the disclosure are initially described in the context of wireless communications systems. Additional aspects are described in the with reference to process flows. Aspects of the disclosure are further illustrated by and described with reference to apparatus diagrams, system diagrams, and flowcharts that relate to spatial metric based mobility procedures using multi-port mobility reference signals.

FIG. 1 illustrates an example of a wireless communications system 100 that supports spatial metric based mobility procedures using multi-port mobility reference signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support spatial metric based mobility procedures using multi-port mobility reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, a network entity 105 and a UE 115 may exchange reference signals and perform a mobility management procedure for the UE 115 based on measurements of the reference signals. The mobility management procedure may include switching cells via which the UE 115 is connected (e.g., handovers), switching beams for the UE 115 (e.g., beam refinement), or other mobility management procedures. As described herein, a network entity 105 and a UE 115 may exchange multi-port reference signals as part of mobility management procedures. The UE 115 may measure the multi-port reference signals and report channel measurements across multiple spatial dimensions, which may improve reliability of such mobility management procedures. The UE 115 may receive, from one or more network entities 105, a reference signal associated with multiple antenna ports (e.g., a multi-port reference signal). The UE 115 may measure a multi-dimensional channel response of the reference signal. The multi-dimensional channel response may be associated with multiple measured channel metrics corresponding to the multiple antenna ports. In some aspects, the UE 115 may measure a channel response of the reference signal received from each antenna port, and the UE 115 may concatenate the channel response to obtain the multi-dimensional channel response. The UE 115 may decompose the multi-dimensional channel response into multiple dimensions.

The UE 115 may transmit a report to the network entity 105 that includes a channel measurement vector. The channel measurement vector may indicate multiple measured channel metrics for one or more dimensions of the channel response based on decomposing the multi-dimensional channel response. The network entity 105 may receive the channel measurement vector and determine one or more mobility management decisions (e.g., cell selection, beam selection) for the UE 115 based on the channel measurements across multiple spatial dimensions. Additionally, or alternatively, the UE 115 may determine the mobility management decisions autonomously based on the channel measurement vector. By performing mobility management procedures based on channel measurements as well as spatial information, the network entity 105 and the UE 115 may improve reliability and throughput of communications.

Figure 2:
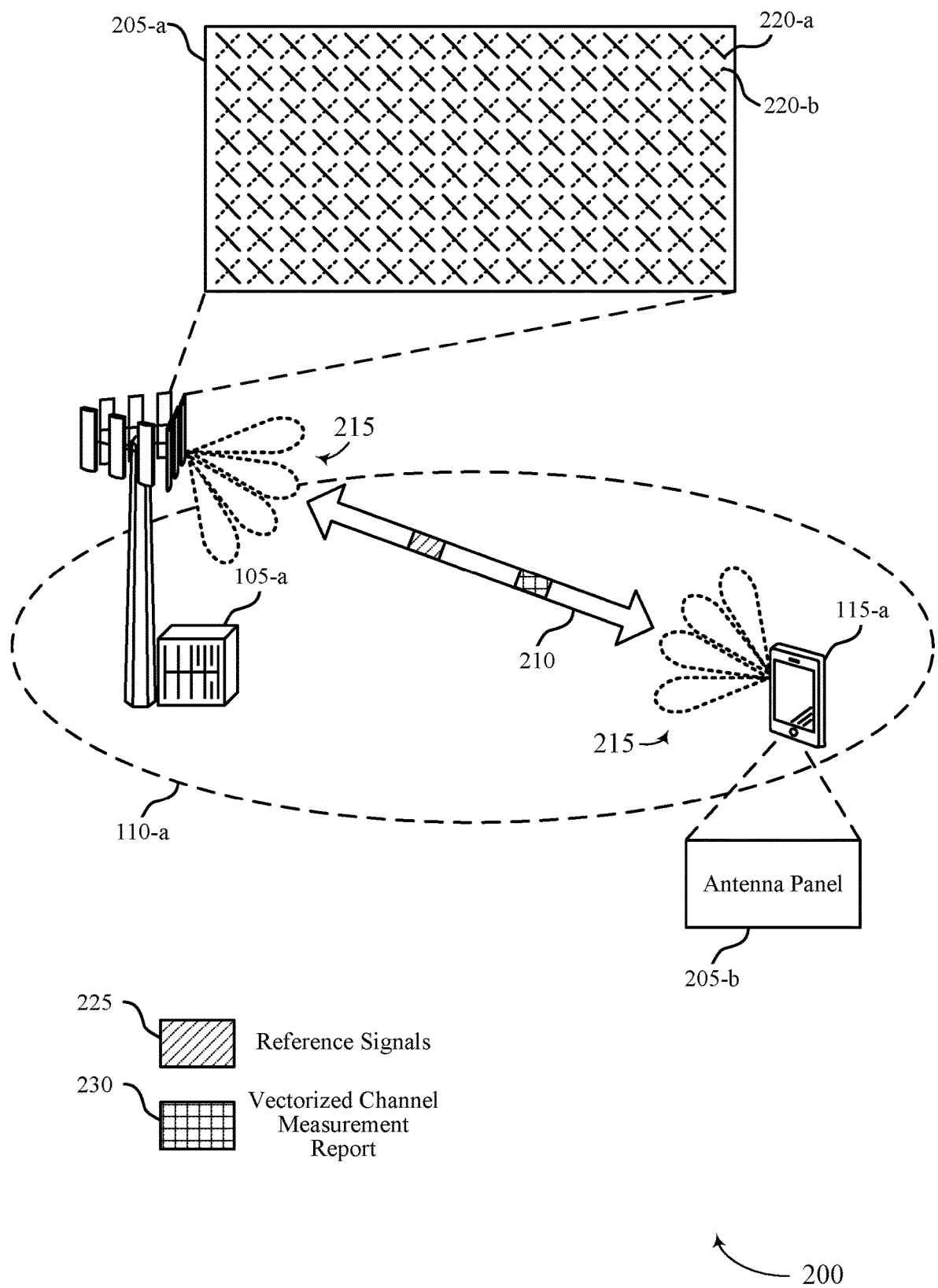

FIG. 2 illustrates an example of a wireless communications system 200 that supports spatial metric based mobility procedures using multi-port mobility reference signals in accordance with one or more aspects of the present disclosure. The wireless communications system 200 may implement or be implemented by aspects of the wireless communications system 100 as described with reference to FIG. 1. For example, the wireless communications system 200 may include a network entity 105-a and a UE 115-a, which may represent examples of a network entity 105 and a UE 115 as described with reference to FIG. 1. The network entity 105-a may communicate with the UE 115-a within a geographic coverage area 110-a and via a communication link 210. The network entity 105-a, the UE 115-a, or both may, in some aspects, be associated with (e.g., include, be deployed with, or be coupled with) an antenna panel 205 for wireless communications.

The network entity 105-a may support MIMO communications using the antenna panel 205-a. The antenna panel 205-a may include multiple antenna ports 220, which may be referred to as antenna arrays, antenna elements, antenna components, or antennas. In some aspects, a quantity of antenna ports 220 in the antenna panel 205-a may be relatively high, and the MIMO communications may be referred to as massive MIMO (mMIMO). Antenna ports or elements within a same antenna panel 205-a may be associated with a relatively high correlation. However, the antenna panel 205-a may support at least two degrees or polarizations of channels. For example, the antennas of the antenna panel 205-a may be polarized in at least a vertical direction and a horizontal direction. A wireless channel associated with a first polarization may be independent (e.g., separate) from a wireless channel associated with a second polarization.

The antenna ports 220 as described herein may refer to polarization-specific antenna ports 220. For example, a same physical antenna panel or array may include two or more antenna ports 220 each associated with a respective polarization. In the example of FIG. 2, the solid diagonal lines in the antenna panel 205-a may represent antenna ports 220-a associated with a first polarization and the dashed diagonal lines in the antenna panel 205-a may represent antenna ports 220-b associated with a second polarization. The antenna panel 205-b at the UE 115-a may represent an example of the antenna panel 205-a at the network entity 105-a. For example, the antenna panel 205-b may include one or more polarization-specific antenna ports 220, as described and illustrated with reference to the antenna panel 205-a. In some aspects, the antenna panel 205-b may include fewer antenna ports or may be relatively smaller in size than the antenna panel 205-a.

The network entity 105-a may perform beam sweeping over a set of beams 215. For example, the network entity 105-a may transmit reference signals 225 to the UE 115-a via the communication link 210 using one or more different beams 215 for each reference signal 225. The UE 115-a may receive the reference signals 225 using different receive beams 215 over time. In some cases, the UE 115-a may measure a signal strength (e.g., RSRP or reference signal received quality (RSRQ)) of the reference signals 225. The UE 115-a and the network entity 105-a may make mobility decisions, such as beam selection, cell selection, handovers, or other mobility decisions, based on the reference signals 225.

In some mobility procedures, the network entity 105-a may support a single antenna port 220 in a single beam direction at a time. For example, the network entity 105-a may perform beamforming in a TDM manner, sweeping over the set of beams 215 across different time intervals. In some aspects, the network entity 105-a may use the antenna port 220-a and the antenna port 220-b at the same time to generate each beam 215, such that the UE 115-a may receive or identify a combined channel, but the UE 115-a may not decipher two separate channels associated with the separate antenna ports 220-a and 220-b. Additionally, or alternatively, the network entity 105-a may perform beamforming using only one of the antenna ports 220-a or 220-b. In either case, spatial information across the two antenna ports 220-a and 220-b may be lost.

In such cases, each reference signal may be associated with a single respective beam ID and a single respective cell ID. The UE 115-a may report a measured signal strength for each beam and cell. The UE 115-a, the network entity 105-a, or both may select a cell or beam direction that is associated with a strongest or greatest signal strength measurement. However, if the reference signals 225 for mobility are each associated with a single port at a given time, the signal strength measurements used for mobility decisions by the network entity 105-a and the UE 115-a may not be indicative of rank, spectral efficiency, and other spatial information. In some aspects, if the UE 115-a selects a cell or beam direction based on a greatest RSRP measurement (e.g., and irrespective of spatial information), the selected beam direction may be associated with a relatively poor rank condition, which may reduce throughput of wireless communications at the UE 115-a.

Techniques, systems, and devices described herein provide for multi-port reference signal transmissions to support the use of spatial information for mobility procedures, which may improve efficiency and reliability of the mobility procedures, among other advantages. For example, because it might be easier to have polarized arrays from a same antenna panel 205 to be beamformed independently (e.g., using a separate RF chain), the network entity 105-a may transmit a reference signal 225 using two independent beams 215 generated simultaneously. The UE 115-a may receive the reference signal 225 and determine or observe two separate channels associated with the reference signal 225. For example, the UE 115-a may observe a first channel associated with a first polarization or antenna port 220-a and a second channel associated with a second polarization or antenna port 220-b.

The network entity 105-a may transmit the multi-port reference signals 225 using one or more multiplexing techniques. For example, the network entity 105-a may transmit a multi-port reference signal 225 using FDM across one or more frequency combs (e.g., subchannels), or the network entity 105-a may transmit the multi-port reference signal 225 using TDM across one or more symbols. Additionally, or alternatively, the network entity 105-a may transmit the multi-port reference signal using delay domain multiplexing across one or more cyclic shifts, code domain multiplexing (e.g., Walsh code or discrete Fourier transform (DFT) based spreading) over multiple symbols, or non-orthogonal code division multiplexing. The multi-port reference signal 225 may be a synchronization signal block (SSB) (e.g., a multi-port SSB), a tracking reference signal (TRS), a CSI-RS, or any combination thereof.

The UE 115-a may receive multiple multi-port reference signals 225. The UE 115-a may search the multi-port reference signals for a respective cell ID and a respective beam ID. For each cell ID and beam ID, the UE 115-a may subsequently search for multiple antenna ports 220 (e.g., spatial dimensions). For polarized antenna panels 205, each multi-port reference signal 225 may be associated with two or more antenna ports 220: one antenna port 220 for each polarization. The UE 115-a may observe a channel response associated with each multi-port reference signal 225. A single-port reference signal 225 may be associated with a scalar channel response for mobility measurement, such as RSRP. However, the multi-port reference signals 225 may each be associated with a channel response vector (e.g., H) or a channel response matrix over the multiple antenna ports 220.

The UE 115-a may perform a transformation of the observed channel response vector or matrix. The transformation may be a singular value decomposition (SVD), a regularized zero forcing (RZF), or some other form of transformation or decomposition of the channel response. The transformation may decompose the channel response into independent dimensions (e.g., orthogonalized dimensions), and each dimension may be associated with a respective set of one or more channel metrics (e.g., RSRP, RSRQ, signal-to-interference-plus-noise ratio (SINR), or some other metrics). The UE 115-a may measure the channel metrics over multiple dimensions based on the reference signals 225. In the example of FIG. 2, each reference signal 225, and thus each channel response, may be associated with multiple spatial dimensions (e.g., polarizations; antenna ports 220) and a respective cell ID and beam ID (e.g., a cell and beam ID pair).

In some aspects, the UE 115-a may select one or more different subsets of antenna ports 220 of the multiple antenna ports 220, and the UE 115-a may perform the transformation based on the selected subsets of antenna ports 220. The UE 115-a may determine whether the network entity 105-a utilized beamforming (e.g., beam combining) across the antenna ports 220, and may perform the channel transformation depending on whether the beamforming was utilized. In some aspects, the UE 115-a may measure an interference covariance structure which may be filtered over time and frequency. The interference covariance structure may be measured, or generated, by the UE 115-a based on the multi-port reference signals 225 for mobility measurements, based on one or more reference signals for interference measurements, or both. The UE 115-a may whiten the measured channel response vector based on the interference covariance structure.

The UE 115-a may transmit a vectorized measurement report 230 for each cell ID and each beam ID to report the measured channel metrics over each dimension. The vectorized measurement report 230 may include a channel measurement vector, which may be a vector of measured channel metric values. In some aspects, a quantity of entries in the channel measurement vector may be the same as a quantity of antenna ports 220 associated with the corresponding multi-port reference signal 225, and each entry may represent measured channel metrics for a corresponding antenna port 220 or a combination of multiple antenna ports 220. Additionally, or alternatively, one or more entries of the channel measurement vector may indicate measured channel metrics for more than one antenna port 220, or more than one entry in the channel measurement vector may be mapped to a same antenna port 220.

In the example of FIG. 2, the network entity 105-a may transmit a multi-port reference signal 225 to the UE 115-a using a first polarization associated with the antenna port 220-a and a second polarization associated with the antenna port 220-b. The UE 115-a may observe a channel response vector, H, that includes at least two entries associated with the two antenna ports 220 (e.g., spatial dimensions). The UE 115-a may decompose the channel response vector into two independent dimensions and may measure channel metrics associated with each dimension. The UE 115-a may transmit the vectorized measurement report 230 to the network entity 105-a based on measuring the channel metrics. The vectorized measurement report 230 may include a first measured channel metric associated with the first antenna port 220-a and a second measured channel metric associated with the second antenna port 220-b. The channel metrics may include signal strength metrics (e.g., RSRP, RSRQ, SINR, or other signal strength metrics), spectral efficiency metrics, rank metrics, or any combination thereof.

In some aspects, the UE 115-a may transmit a vectorized measurement report 230 that indicates a respective vector of channel measurements for each reference signal 225 (e.g., each beam ID and each cell ID). Additionally, or alternatively, the UE 115-a may report a vectorized measurement report 230 for a subset of beam IDs and cell IDs associated with the strongest (e.g., best) channel measurements. For example, the UE 115-a may average values of the measured channel metrics in a given channel measurement vector, and the UE 115-a may compare the averaged values across different beam and cell IDs. The UE 115-a may select a subset of beam and cell IDs that are associated with the greatest average values and transmit vectorized measurement reports 230 for those values. The UE 115-a may refrain from transmitting reports for other cell and beam IDs to reduce overhead and improve efficiency. In some aspects, the UE 115-a may transmit a single report that includes multiple channel measurement vectors.

The vectorized measurement report 230 may thereby indicate spatial information associated with the multi-port reference signals 225 for mobility. The network entity 105-a may utilize the spatial information as well as the other measured channel metrics indicated via the vectorized measurement report 230 to determine one or more mobility metrics for the UE 115-a. In some aspects, the network entity 105-a may utilize one or more other parameters, such as cell loading, an interference scenario, or the like, in addition to the spatial information indicated via the vectorized measurement report 230, to determine the mobility metrics for the UE 115-a. The network entity 105-a may determine a handover decision for the UE 115-a, a beam 215 for communications with the UE 115-a, or both based on the information. The network entity 105-a may transmit signaling or a message to the UE 115-a to indicate the mobility information (e.g., a handover command, a beam 315).

Additionally, or alternatively, in some aspects, the UE 115-a may be granted authority to autonomously determine the mobility metrics or mobility decisions, or both based on the multi-dimensional measurements obtained by the UE 115-a based on the multi-port reference signals 225 across multiple cells and multiple beams. For example, the UE 115-a may determine a handover decision, a beam 215 to use for communications, or both.

In some aspects, the UE 115-a may be equipped with an antenna panel 205-b that may include multiple antenna ports 220, as described and illustrated with respect to the antenna panel 205-a. The UE 115-a may, in some aspects, transmit one or more multi-port reference signals 225 to the network entity 105-a. In such cases, the network entity 105-a may measure the multi-port reference signals 225 and generate a multi-dimensional channel measurement vector. The network entity 105-a may utilize the multi-dimensional channel measurement vector in the uplink to make mobility management decisions for the UE 115-a. In such cases, the uplink multi-port mobility reference signals 225 may be multiplexed across time, space, and frequency in similar ways as for downlink multi-port mobility reference signals 225 described herein.

The UE 115-a, the network entity 105-a, or both may thereby utilize the multi-dimensional channel measurements included in the vectorized measurement report 230 to account for signal strength metrics as well as spatial information, such as rank, when determining mobility management metrics, which may improve throughput and reliability of wireless communications, among other advantages.

Figure 3:
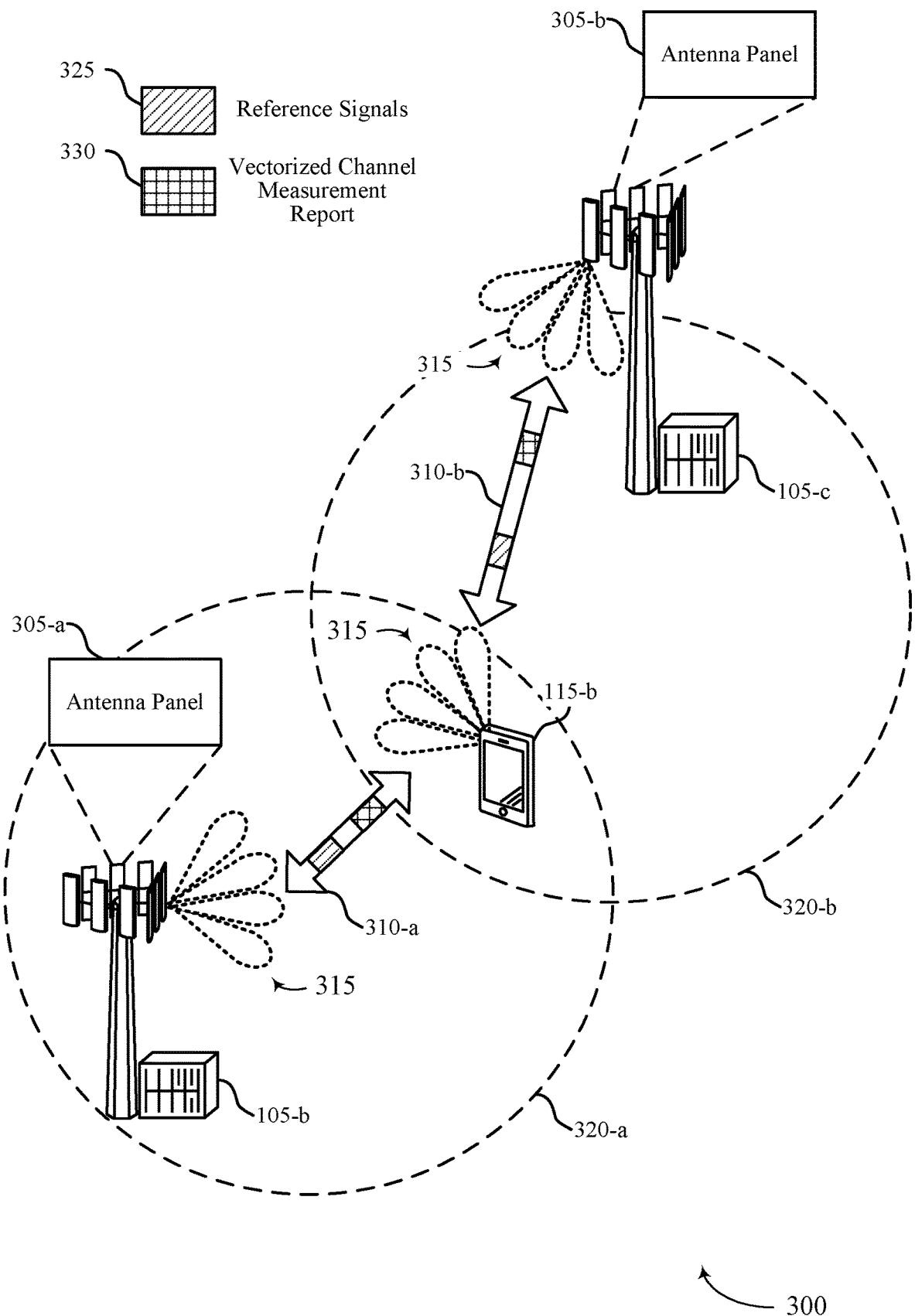

FIG. 3 illustrates an example of a wireless communications system 300 that supports spatial metric based mobility procedures using multi-port mobility reference signals in accordance with one or more aspects of the present disclosure. The wireless communications system 300 may implement or be implemented by aspects of the wireless communications system 100 as described with reference to FIG. 1. For example, the wireless communications system 300 may include a UE 115-b, a network entity 105-b and a network entity 105-c, which may represent examples of a UE 115 and a network entity 105 as described with reference to FIGS. 1 and 2. The network entity 105-b may be associated with a cell 320-a and the network entity 105-c may be associated with a cell 320-b. In some aspects, each of the cells 320-a and 320-b may be associated with a respective cell ID.

The network entities 105-b and 105-c may, in some aspects, be deployed with or coupled with a respective antenna panel 305 (e.g., antenna panels 305-a and 305-b), which may represent examples of the antenna panel 205 described with reference to FIG. 2. The UE 115-b, the network entity 105-b, and the network entity 105-c may each generate a respective set of beams 315 to use for transmission and reception of wireless communications. The network entity 105-b may communicate with the UE 115-b via a respective communication link 310-a within the cell 320-a and the network entity 105-c may communicate with the UE 115-b via a respective communication link 310-b within the cell 320-b.

The wireless communications system 300 may support cell-free MIMO, which may be referred to as distributed mMIMO or MIMO from multiple antenna panels, in some aspects. That is, the UE 115-b may not be restricted to transmit to or receive from a single cell 320. Multiple network entities 105 associated with multiple different cells 320 may transmit to the UE 115-b at the same time. The network entities 105-b and 105-c may support such distributed mMIMO communications using the antenna panels 305-a and 305-b, respectively. The antenna panels 305-a and 305-b may each include multiple antenna ports, which may be polarization-specific, as described with reference to FIG. 2. In some aspects, the network entities 105-b and 105-c may represent examples of RRHs or TRPs, or some other node or component of a network entity 105. The network entities 105-b and 105-c may communicate via a backhaul communication link (not pictured in FIG. 3).

Techniques described herein provide for the UE 115-b to perform measurements for mobility management procedures across multiple cells 320, across multiple beams 315, or both. For example, during distributed mMIMO communications, the UE 115-b may receive a jointed transmission associated with two or more cell IDs (e.g., multiple RRHs may transmit multi-port reference signals 325 simultaneously) or the UE 115-b may receive two mobility reference signals 325 that are regarded as possible to be coherently joint transmitted (e.g., beamformed) to the UE 115-b. In the example of FIG. 3, the network entity 105-b may transmit a reference signal 325 for mobility measurements to the UE 115-b via the communication link 310-a. The reference signal 325 may be associated with a first cell ID of the cell 320-a associated with the network entity 105-b. The network entity 105-c may similarly transmit the reference signal 325 to the UE 115-b via the communication link 310-b at the same time as the transmission by the network entity 105-b (e.g., via a joint transmission). The reference signal 325 transmitted by the network entity 105-c may be associated with a second cell ID of the cell 320-b associated with the network entity 105-c. The network entities 105-b and 105-c may, in some aspects, utilize two or more antenna ports of each antenna panel 305-a and 305-b (e.g., two or more polarizations) to transmit the reference signal 325, as described with reference to FIG. 2. Additionally, or alternatively, throughout the cell-free MIMO system, there may be more than two antenna ports across multiple RRHs, TRPs, or both.

The UE 115-b may observe a multi-dimensional channel response associated with each of the reference signals 325 transmitted by each of the network entities 105-b and 105-c. For example, the transmission by the network entity 105-b may generate a first channel response vector of {H,V}, where H may represent a first polarization (e.g., a horizontal polarization) and V may represent a second polarization (e.g., a vertical polarization) of the antenna panel 305-a. The transmission by the network entity 105-c may generate a second channel response vector of {H,V}, where H may represent a first polarization (e.g., a horizontal polarization)

and V may represent a second polarization (e.g., a vertical polarization) of the antenna panel 305-b. Thus, the first cell ID (e.g., CID1, which could be a TRP ID) may be associated with a first {H,V} response and the second cell ID (e.g., CID2, which could be a TRP ID) may be associated with a second {H,V} response. The channel responses may be concatenated based on the joint transmissions by the network entities 105-b and 105-c. The concatenated channel response may be viewed, by the UE 115-b, as four independent ports (e.g., CID1H, CID1V, CID2H, CID2V). The equivalent channel under consideration may have both polarized arrays from two antenna panels 305 jointly beamformed to the UE 115-b.

The UE 115-b may additionally, or alternatively, receive reference signals 325 that may be considered jointly across multiple beam IDs, in some aspects. For example, the network entity 105-b may utilize multiple different antenna ports to generate different beam combinations. The network entity 105-b may transmit a multi-port reference signal 325 to the UE 115-b by multiplexing the multi-port reference signal 325 across the multiple beams 315 (e.g., FDM, TDM, code division multiplexing (CDM), non-orthogonal code domain multiplexing), or some other type of multiplexing). In such cases, the multi-port reference signal 325 may be associated with multiple different beam IDs.

The joint transmissions may be coherent joint transmissions or non-coherent joint transmissions. The network entity 105-b, the network entity 105-c, or some other network entity 105 may, in some aspects, transmit signaling to the UE 115-b to indicate which cell IDs, beam IDs, or both can be combined for coherent joint transmissions and/or non-coherent joint transmissions and corresponding joint multi-port mobility measurements. The signaling may be, for example, a system information block (SIB), a master information block (MIB), or some other control signaling that indicates the combinable cell and beam IDs. The network entities 105 may determine which cell IDs or beam IDs may be combined or jointed for coherent or non-coherent transmissions based on a capability of the network entities 105, in some aspects. For example, reference signals 325 that are generated from a same antenna panel 305 with a relatively limited quantity of radio frequency (RF) chains may not be independent, and may not be considered as multiple ports but may be considered as multiple beam directions. That is, a single antenna panel 305 may not support multiple joint transmissions using different beams 315 at a same time.

Additionally, or alternatively, one or more rules may be defined (e.g., pre-defined in a standard or configured) that indicate a set of cell IDs and beam IDs that may be combined for coherent or non-coherent joint transmission and multiport mobility measurement. The rules may be based on a value or structure of the IDs, in some aspects. For example, the rules may specify that IDs having a same first or last digit may be combinable, or that IDs having above a threshold value may be combinable, or some other rule related to a structure or value of the IDs. In some aspects, the one or more rules may indicate a subset of a total quantity of cell IDs and beam IDs that may be assumed to be generated independently and support coherent or non-coherent joint transmission. The cell IDs and beam IDs may, in some aspects (e.g., for cell-free mMIMO systems), be classified or configured into two (or more) groups: a first group associated with cell and beam IDs that support coherent joint processing and a second group associated with cell and beam IDs that support non-coherent joint processing.

In some aspects, if a transmission in a same symbol (e.g., at a given time) is associated with two or more different cell IDs or two or more different beam IDs, or both, and the transmission is multiplexed in one or more multiplexing domains that are different than time (e.g., the transmission is not TDMed), the UE 115-b may assume the two or more different cell and/or beam IDs are independent and can support simultaneous or joint transmissions (e.g., coherent or non-coherent). In other words, two or more IDs may be considered dependent, and may not support joint transmissions to a UE 115 if a transmission is TDMed across the cell IDs or beam IDs, in some aspects. Other multiplexing techniques that may indicate independent IDs may include, for example, FDM, cyclic-shift multiplexing, CDM, or the like. In some aspects, there may be a rule or a rule set associated with a combination of one or more of the multiplexing techniques that indicates support for coherent or non-coherent joint transmissions.

As described herein, the UE 115-b may measure the concatenated channel response matrix or vector and report the vectorized measurements for mobility management procedures. In some aspects, the UE 115-b may perform a transformation to decompose the concatenated channel response into multiple independent dimensions. Each dimension may be associated with a respective channel metric measurement, such as a respective signal strength measurement. The UE 115-b may additionally, or alternatively, measure a rank or spectral efficiency of the channel across the multiple dimensions. The UE 115-b may transmit a vectorized measurement report 330 to the network entity 105-b, the network entity 105-c, or both to indicate the channel measurements across the multiple dimensions. The UE 115-b may account for which cell and beam IDs support joint processing when the UE 115-b obtains the multi-dimensional channel measurements. For example, if coherent joint processing is supported for a given multiple port combination, the UE 115-b may perform a transformation, such as SVD, of the channel response to obtain signal strength metrics, spectral efficiency information, rank information, or any combination thereof. If coherent joint processing is not supported, the UE 115-b may consider a single dimension of the channel response at a time when obtaining the channel measurements (e.g., channel port selection or noncoherent combining, like power or RSRP combining).

The vectorized measurement report 330 may represent an example of the vectorized measurement report 230 described with reference to FIG. 2. In the example of FIG. 3, the channel measurement vector indicated via the vectorized measurement report 330 may be associated with one or more different cell IDs, one or more different beam IDs, or both. In some aspects, the UE 115-b may estimate or measure an expected rank or conditioning associated with different combinations of beam and cell IDs, and the vectorized measurement report 330 may indicate the expected rank or conditioning information. The vectorized measurement report 330 may thereby indicate channel information across multiple different spatial dimensions (e.g., combinations of antenna ports and beams 315).

In some aspects, the wireless communications system 300 may support multi-dimensional channel metric reporting for a threshold quantity of dimensions. That is, if the UE 115-b receives joint transmissions from a relatively large quantity of RRHs, the channel response may be relatively large, and reporting channel measurements may be associated with relatively high overhead. As such, the UE 115-b may trim the channel dimensions (e.g., eigen dimensions) based on the threshold quantity before reporting channel measurements. For example, if the UE 115-*b* observes a channel response that is combined over multiple beams 315 (e.g., four beams 315) and multiple dimensions (e.g., eight dimensions, or antenna ports), and the threshold quantity is two (e.g., up to two eigen dimensions are supported), the UE 115-*b* may report the signal strength measurements and the associated beam and cell IDs for the two dimensions associated with the strongest channel metric measurements.

The UE 115-*b*, the network entity 105-*b*, and the network entity 105-*c* may thereby support multi-port mobility reference signals 325, which may be used for measurements across spatial dimensions. The UE 115-*b* may report a multi-dimensional channel measurement vector to one or both of the network entities 105-*b* and 105-*c*. The network entities 105-*b* and 105-*c* may determine one or more mobility metrics for the UE 115-*b* based on the multi-dimensional channel measurement vector (e.g., a handover command, a beam 315, or the like). Additionally, or alternatively, the UE 115-*b* may determine the mobility metrices. In some aspects, the UE 115-*b* may be equipped with an antenna panel 305 (not pictured in FIG. 3) that may include multiple antenna ports. In such cases, the UE 115-*b* may transmit uplink multi-port reference signals 325 to the network entity 105-*b*, the network entity 105-*c*, or both. The network entities 105 may receive the multi-port reference signals 325, and generate a multi-dimensional channel measurement vector based on the reference signals 325, as described herein. In such cases, the network entity 105 may determine mobility metrics based on determining the channel measurement vector.

By utilizing the channel measurements across spatial dimensions, the devices may account for channel strength as well as other spatial information when performing mobility procedures, which may improve throughput and reliability of communications, among other advantages.

Figure 4:
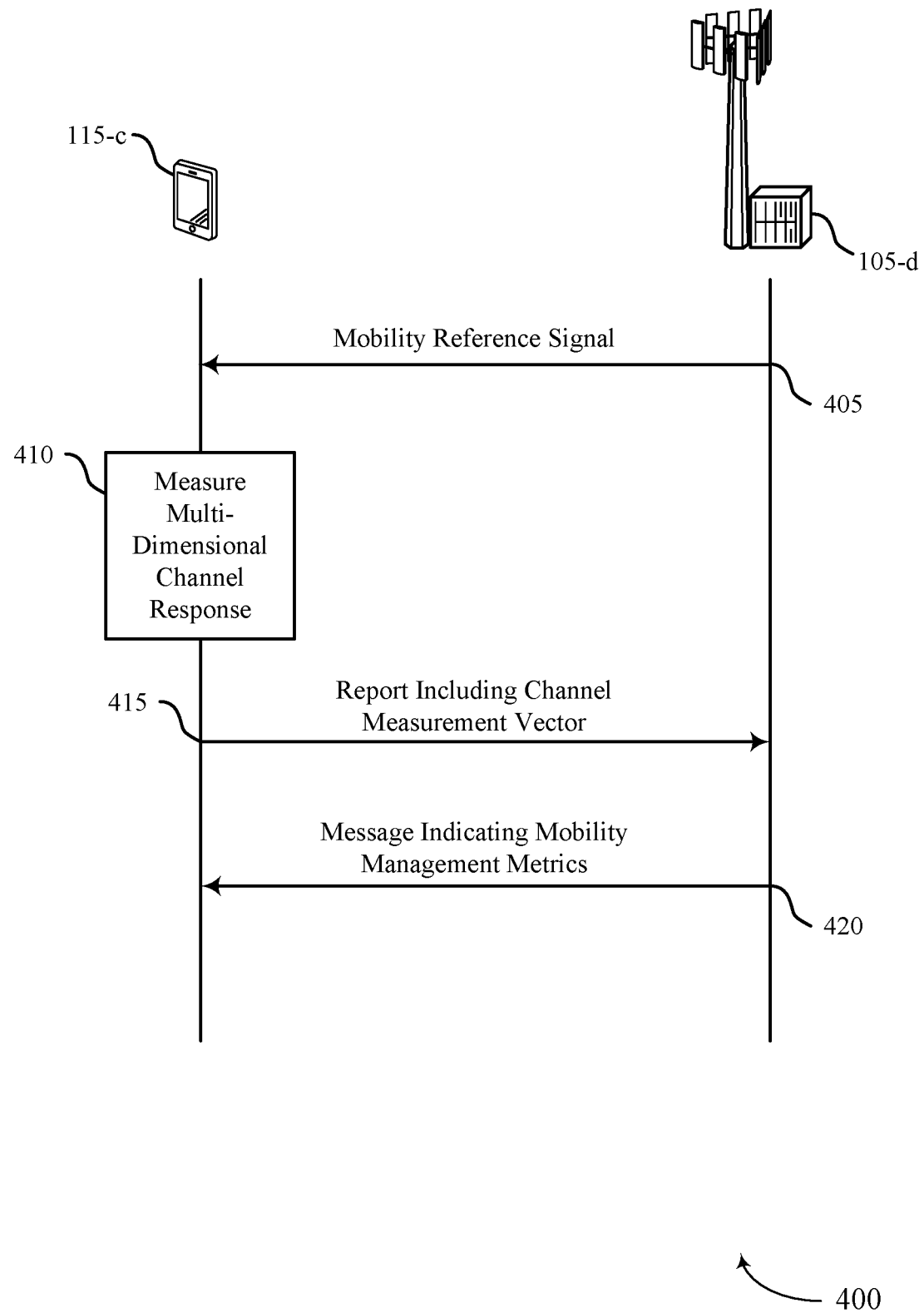
FIG. 4 illustrates an example of a process flow that supports spatial metric based mobility procedures using multi-port mobility reference signals in accordance with one or more aspects of the present disclosure.

FIG. 4 illustrates an example of a process flow 400 that supports spatial metric based mobility procedures using multi-port mobility reference signals in accordance with one or more aspects of the present disclosure. The process flow 400 may implement or be implemented by aspects of the wireless communications systems 100, 200, and 300, as described with reference to FIGS. 1-3. For example, the process flow 400 illustrates communications between a UE 115-*c* and a network entity 105-*d*. The UE 115-*c* and the network entity 105-*d* may represent aspects of corresponding devices as described with reference to FIGS. 1-3. In some aspects, the UE 115-*c* and the network entity 105-*d* may utilize multi-port mobility reference signals to facilitate spatial metric-based mobility management procedures for the UE 115-*c*, as described herein.

In the following description of the process flow 400, the operations between the UE 115-*c* and the network entity 105-*d* may be performed in different orders or at different times. Some operations may also be left out of the process flow 400, or other operations may be added. Although the UE 115-*c* and the network entity 105-*d* are shown performing the operations of the process flow 400, some aspects of some operations may also be performed by one or more other wireless devices.

At 405, the network entity 105-*d* may transmit a reference signal to the UE 115-*c*. The reference signal may be associated with multiple antenna ports. For example, the reference signal may be transmitted from multiple antenna ports of the network entity 105-*d*, or multiple antenna ports distributed across one or more network entities 105-*d* (e.g., distributed across TRPs, RRHs, or some other node or component of a network). The multiple antenna ports may be associated with a same cell ID, a same beam ID, different cell IDs, different beam IDs, or any combination thereof. The reference signal may be referred to as a multi-port mobility reference signal in some aspects herein. The reference signal may be an SSB, a TRS, a CSI-RS, or some other type of reference signal. In some aspects the network entity 105-*d* may transmit the reference signal and the UE 115-*c* may receive the reference signal associated with the multiple antenna ports using FDM, TDM, delay domain multiplexing, CDM, or any combination thereof across the multiple antenna ports.

At 410, the UE 115-*c* may measure a multi-dimensional channel response based on the reference signal. The multi-dimensional channel response may be associated with multiple measured channel metrics corresponding to the multiple antenna ports. In some aspects, the UE 115-*c* may measure a respective channel response of the reference signal associated with each cell ID and each beam ID separately (e.g., if the reference signal is associated with multiple cell IDs and/or multiple beam IDs), and the UE 115-*c* may concatenate the multiple channel responses to obtain the multi-dimensional channel response. In some aspects, the UE 115-*c* may perform a transformation on the multi-dimensional channel response to decompose the multi-dimensional channel response and obtain two or more dimensions of the multi-dimensional channel response. The UE 115-*c* may identify measured channel metrics associated with each dimension of the multi-dimensional channel response. The UE 115-*c* may measure the channel metrics based on decomposing the channel response or the decomposition of the multi-dimensional channel response may indicate the measured channel metrics.

At 415, the UE 115-*c* may transmit a report that includes a channel measurement vector indicating the multiple measured channel metrics for one or more dimensions of the multi-dimensional channel response. If the reference signal is received from multiple antenna ports associated with a same beam ID and cell ID (e.g., from a same antenna panel of the network entity 105-*d*), the measured channel metrics of the channel measurement vector may be associated with the same beam ID and cell ID. If the reference signal is received from multiple antenna ports associated with two or more cell IDs, two or more beam IDs, or both (e.g., a joint transmission across multiple antenna panels, as described with reference to FIG. 3), the measured channel metrics of the channel measurement vector may be associated with the two or more cell IDs, the two or more beam IDs, or both. In some aspects, the two or more cell IDs, the two or more beam IDs, or both may be associated with a favorable (e.g., best) RSRP, channel strength, sum channel capacity, or the like.

In some aspects, each element of the channel measurement vector may be a measured channel metric that may be associated with a respective antenna port of the multiple antenna ports (e.g., a one-to-one mapping). For example, the UE 115-*c* may report at least one measured channel metric for each antenna port. Additionally, or alternatively, each element of the channel measurement vector may be a measured channel metric that may be associated with a respective set of two or more antenna ports of the multiple antenna ports. For example, the UE 115-*c* may report a measured channel metric for one or more combinations or groupings of antenna ports (e.g., an averaged channel metric measurement across ports). The measured channel metrics may be signal strength metrics, spectral efficiency metrics, rank metrics, or any combination thereof.

At 420, in some aspects, the network entity 105-*d* may transmit a message to the UE 115-*c*. The message may indicate one or more metrics associated with mobility management for the UE 115-*c* based on the report that indicates the channel measurement vector. For example, the network entity 105-*d* may determine whether to initiate a handover procedure for the UE 115-*c*, whether to update a beam for communications by the UE 115-*c* or some other mobility management decision for the UE 115-*c* based on the multi-dimensional information indicated via the channel measurement vector and one or more other parameters associated with communications in a cell supported by the network entity 105-*d*. The network entity 105-*d* may indicate the mobility management decisions to the UE 115-*c* via the message.

In some other aspects, the UE 115-*c* may be configured to autonomously make one or more mobility management decisions, such as handover requests, beam refinement, or both based on the channel measurement vector. In such cases, the UE 115-*c* may perform mobility management procedure. The UE 115-*c* may transmit a message to the network entity 105-*d* to indicate the mobility management decisions made by the UE 115-*c*.

By utilize a multi-port mobility reference signal to perform channel measurements, the UE 115-*c* may generate and report a channel measurement vector that includes channel measurement information across multiple spatial dimensions. By utilizing the spatial information to perform mobility management procedures, the network entity 105-*d*, the UE 115-*c*, or both may improve efficiency and reliability of mobility management procedures.

Figure 5:
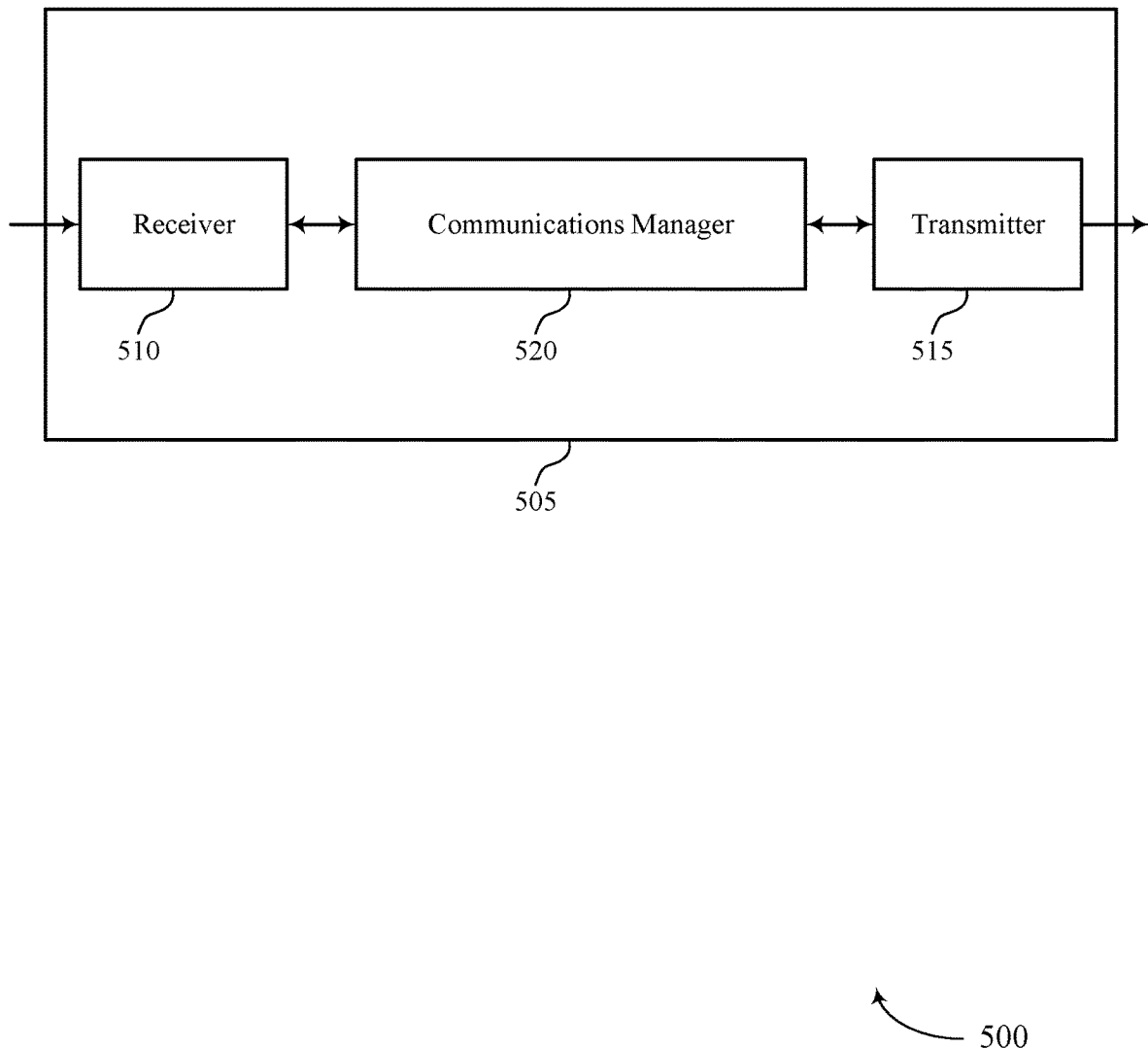
FIGS. 5 and 6 show block diagrams of devices that support spatial metric based mobility procedures using multi-port mobility reference signals in accordance with one or more aspects of the present disclosure.

FIG. 5 shows a block diagram 500 of a device 505 that supports spatial metric based mobility procedures using multi-port mobility reference signals in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to spatial metric based mobility procedures using multi-port mobility reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to spatial metric based mobility procedures using multi-port mobility reference signals). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of spatial metric based mobility procedures using multi-port mobility reference signals as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving a reference signal associated with a set of multiple antenna ports. The communications manager 520 may be configured as or otherwise support a means for measuring, based on receiving the reference signal, a multi-dimensional channel response, the multi-dimensional channel response associated with a set of multiple measured channel metrics corresponding to the set of multiple antenna ports. The communications manager 520 may be configured as or otherwise support a means for transmitting, based on measuring the multi-dimensional channel response, a report that includes a channel measurement vector indicating the set of multiple measured channel metrics for one or more dimensions of the multi-dimensional channel response.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources, among other advantages.

Figure 6:
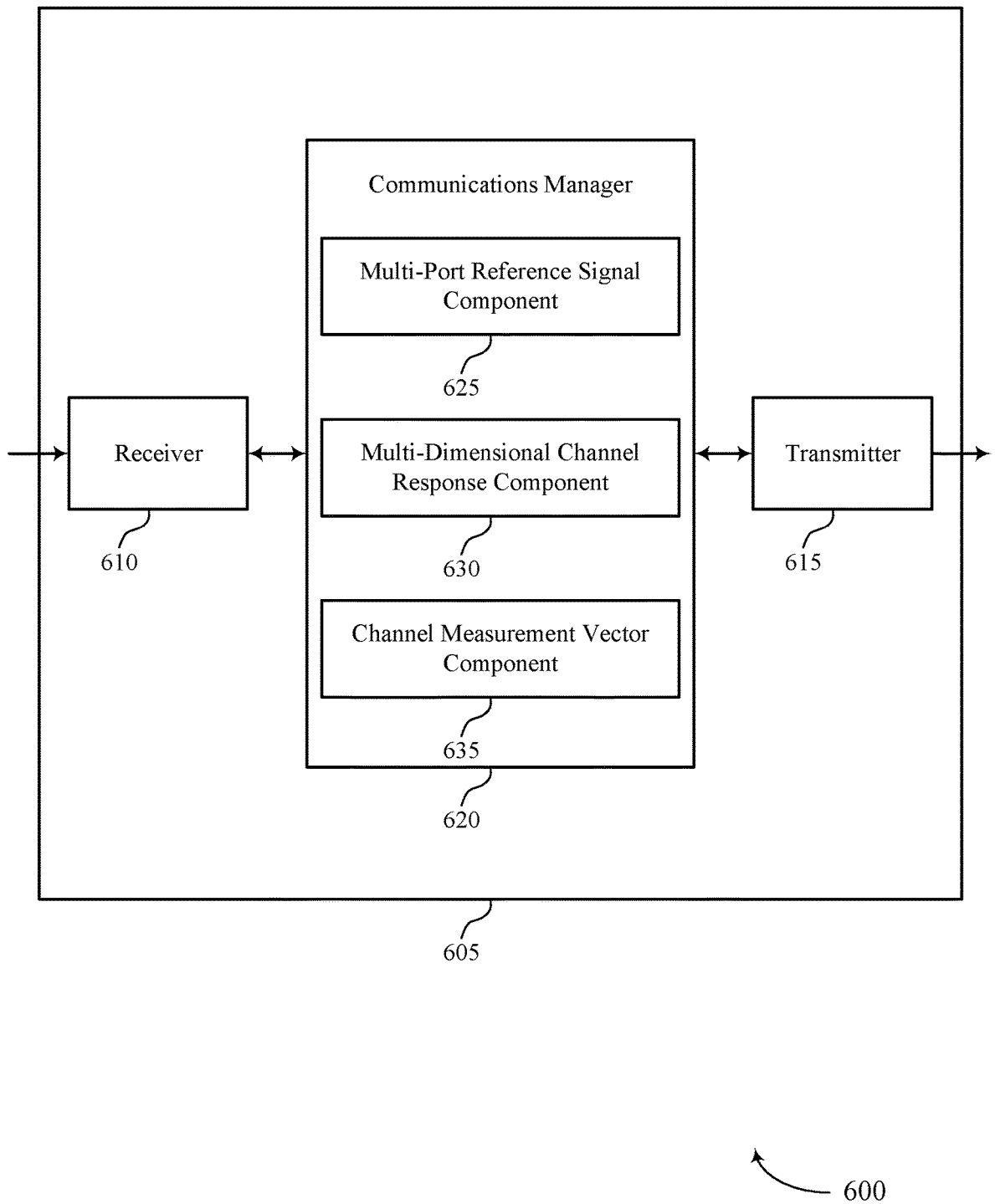

FIG. 6 shows a block diagram 600 of a device 605 that supports spatial metric based mobility procedures using multi-port mobility reference signals in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to spatial metric based mobility procedures using multi-port mobility reference signals). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to spatial metric based mobility procedures using multi-port mobility reference signals). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of spatial metric based mobility procedures using multi-port mobility reference signals as described herein. For example, the communications manager 620 may include a multi-port reference signal component 625, a multi-dimensional channel response component 630, a channel measurement vector component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The multi-port reference signal component 625 may be configured as or otherwise support a means for receiving a reference signal associated with a set of multiple antenna ports. The multi-dimensional channel response component 630 may be configured as or otherwise support a means for measuring, based on receiving the reference signal, a multi-dimensional channel response, the multi-dimensional channel response associated with a set of multiple measured channel metrics corresponding to the set of multiple antenna ports. The channel measurement vector component 635 may be configured as or otherwise support a means for transmitting, based on measuring the multi-dimensional channel response, a report that includes a channel measurement vector indicating the set of multiple measured channel metrics for one or more dimensions of the multi-dimensional channel response.

Figure 7:
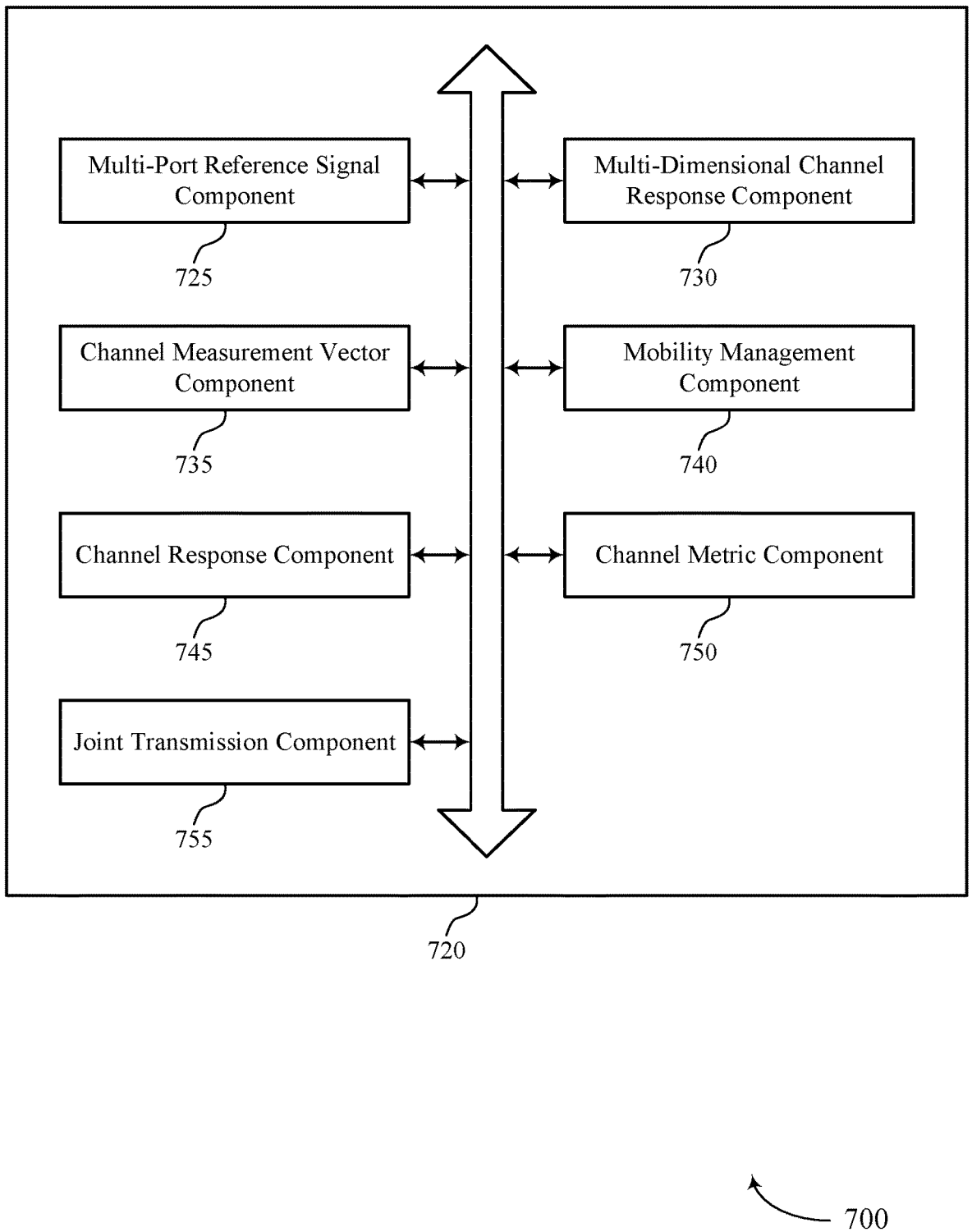
FIG. 7 shows a block diagram of a communications manager that supports spatial metric based mobility procedures using multi-port mobility reference signals in accordance with one or more aspects of the present disclosure.

FIG. 7 shows a block diagram 700 of a communications manager 720 that supports spatial metric based mobility procedures using multi-port mobility reference signals in accordance with one or more aspects of the present disclosure. The communications manager 720 may be an example of aspects of a communications manager 520, a communications manager 620, or both, as described herein. The communications manager 720, or various components thereof, may be an example of means for performing various aspects of spatial metric based mobility procedures using multi-port mobility reference signals as described herein. For example, the communications manager 720 may include a multi-port reference signal component 725, a multi-dimensional channel response component 730, a channel measurement vector component 735, a mobility management component 740, a channel response component 745, a channel metric component 750, a joint transmission component 755, or any combination thereof. Each of these components may communicate, directly or indirectly, with one another (e.g., via one or more buses).

The communications manager 720 may support wireless communications at a UE in accordance with examples as disclosed herein. The multi-port reference signal component 725 may be configured as or otherwise support a means for receiving a reference signal associated with a set of multiple antenna ports. The multi-dimensional channel response component 730 may be configured as or otherwise support a means for measuring, based on receiving the reference signal, a multi-dimensional channel response, the multi-dimensional channel response associated with a set of multiple measured channel metrics corresponding to the set of multiple antenna ports. The channel measurement vector component 735 may be configured as or otherwise support a means for transmitting, based on measuring the multi-dimensional channel response, a report that includes a channel measurement vector indicating the set of multiple measured channel metrics for one or more dimensions of the multi-dimensional channel response.

In some examples, to support receiving the reference signal, the multi-port reference signal component 725 may be configured as or otherwise support a means for receiving the reference signal from the set of multiple antenna ports associated with a same cell ID and a same beam ID, where the channel measurement vector indicates the set of multiple measured channel metrics associated with the same cell ID and the same beam ID.

In some examples, to support receiving the reference signal, the multi-port reference signal component 725 may be configured as or otherwise support a means for receiving the reference signal from the set of multiple antenna ports associated with two or more cell IDs, two or more beam IDs, or both, where the channel measurement vector indicates the set of multiple measured channel metrics associated with the two or more cell IDs, the two or more beam IDs, or both.

In some examples, to support measuring the multi-dimensional channel response, the channel response component 745 may be configured as or otherwise support a means for measuring a respective channel response associated with each of the two or more cell IDs, associated with each of the two or more beam IDs, or both. In some examples, to support measuring the multi-dimensional channel response, the multi-dimensional channel response component 730 may be configured as or otherwise support a means for concatenating the respective channel responses to obtain the multi-dimensional channel response.

In some examples, the channel metric component 750 may be configured as or otherwise support a means for measuring the set of multiple channel metrics based on the multi-dimensional channel response. In some examples, the channel metric component 750 may be configured as or otherwise support a means for determining a subset of channel metrics of the set of multiple channel metrics associated with a subset of the one or more dimensions of the multi-dimensional channel response, the subset of channel metrics associated with a greatest metric value, where the channel measurement vector includes the subset of channel metrics based on the determining.

In some examples, the joint transmission component 755 may be configured as or otherwise support a means for receiving a signal that indicates the two or more cell IDs, the two or more beam IDs, or both support coherent joint transmissions or non-coherent joint transmissions for multi-port channel measurement.

In some examples, the joint transmission component 755 may be configured as or otherwise support a means for determining that the two or more cell IDs, the two or more beam IDs, or both support coherent joint transmissions or non-coherent joint transmissions for multi-port channel measurement based on values of the two or more cell IDs, the two or more beam IDs, or both.

In some examples, the joint transmission component 755 may be configured as or otherwise support a means for determining that the two or more cell IDs, the two or more beam IDs, or both support coherent joint transmissions or non-coherent joint transmissions for multi-port channel measurement based on a multiplexing mode associated with the reference signal.

In some examples, to support measuring the multi-dimensional channel response, the multi-dimensional channel response component 730 may be configured as or otherwise support a means for measuring a channel response vector associated with receiving the reference signal from the set of multiple antenna ports. In some examples, to support measuring the multi-dimensional channel response, the multi-dimensional channel response component 730 may be configured as or otherwise support a means for performing a transformation of the channel response vector to obtain the one or more dimensions of the multi-dimensional channel response.

In some examples, the multi-dimensional channel response component 730 may be configured as or otherwise support a means for determining whether the reference signal is associated with beamforming across one or more subsets of antenna ports of the set of multiple antenna ports, where performing the transformation of the channel response vector is based on the determining.

In some examples, the channel response component 745 may be configured as or otherwise support a means for whitening the channel response vector based on an interference covariance structure, where the channel response vector is measured is across multiple antennas that support joint antenna processing.

In some examples, the channel metric component 750 may be configured as or otherwise support a means for measuring the set of multiple measured channel metrics based on decomposing the channel response vector into the one or more dimensions.

In some examples, each measured channel metric of the set of multiple measured channel metrics in the channel measurement vector is associated with a respective antenna port of the set of multiple antenna ports. In some examples, each measured channel metric of the set of multiple measured channel metrics in the channel measurement vector is associated with a respective set of two or more antenna ports of the set of multiple antenna ports.

In some examples, the mobility management component 740 may be configured as or otherwise support a means for receiving a message that indicates one or more metrics associated with mobility management for the UE based on the report that indicates the channel measurement vector. In some examples, the mobility management component 740 may be configured as or otherwise support a means for determining one or more metrics associated with mobility management for the UE based on the report that indicates the channel measurement vector.

In some examples, to support receiving the reference signal, the multi-port reference signal component 725 may be configured as or otherwise support a means for receiving the reference signal from the set of multiple antenna ports based on FDM across a set of multiple frequency combs, TDM across a set of multiple symbols, delay domain multiplexing across a set of multiple cyclic shifts, CDM, or non-orthogonal code division multiplexing.

In some examples, the set of multiple measured channel metrics include signal strength metrics, spectral efficiency metrics, rank metrics, a set of antenna ports of the set of multiple antenna ports that is associated with each of the set of multiple measured channel metrics, or any combination thereof. In some examples, the reference signal includes a SSB, a TRS, or a CSI-RS.

Figure 8:
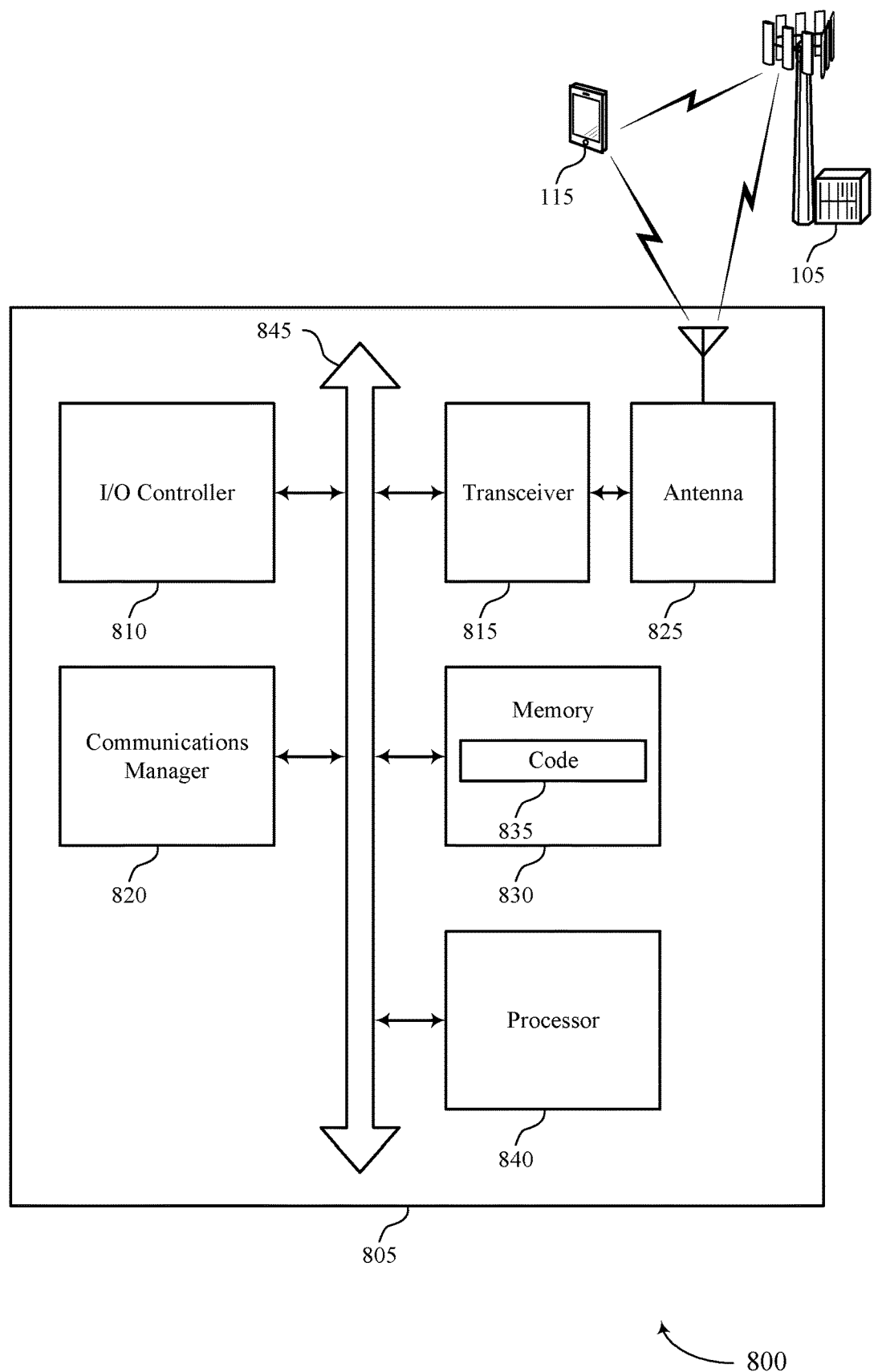
FIG. 8 shows a diagram of a system including a device that supports spatial metric based mobility procedures using multi-port mobility reference signals in accordance with one or more aspects of the present disclosure.

FIG. 8 shows a diagram of a system 800 including a device 805 that supports spatial metric based mobility procedures using multi-port mobility reference signals in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting spatial metric based mobility procedures using multi-port mobility reference signals). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a reference signal associated with a set of multiple antenna ports. The communications manager 820 may be configured as or otherwise support a means for measuring, based on receiving the reference signal, a multi-dimensional channel response, the multi-dimensional channel response associated with a set of multiple measured channel metrics corresponding to the set of multiple antenna ports. The communications manager 820 may be configured as or otherwise support a means for transmitting, based on measuring the multi-dimensional channel response, a report that includes a channel measurement vector indicating the set of multiple measured channel metrics for one or more dimensions of the multi-dimensional channel response.

By including or configuring the communications manager 820 in accordance with examples as described herein, the device 805 may support techniques for improved communication reliability, reduced latency, reduced power consumption, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of spatial metric based mobility procedures using multi-port mobility reference signals as described herein, or the processor 840 and the memory 830 may be otherwise configured to perform or support such operations.

Figure 9:
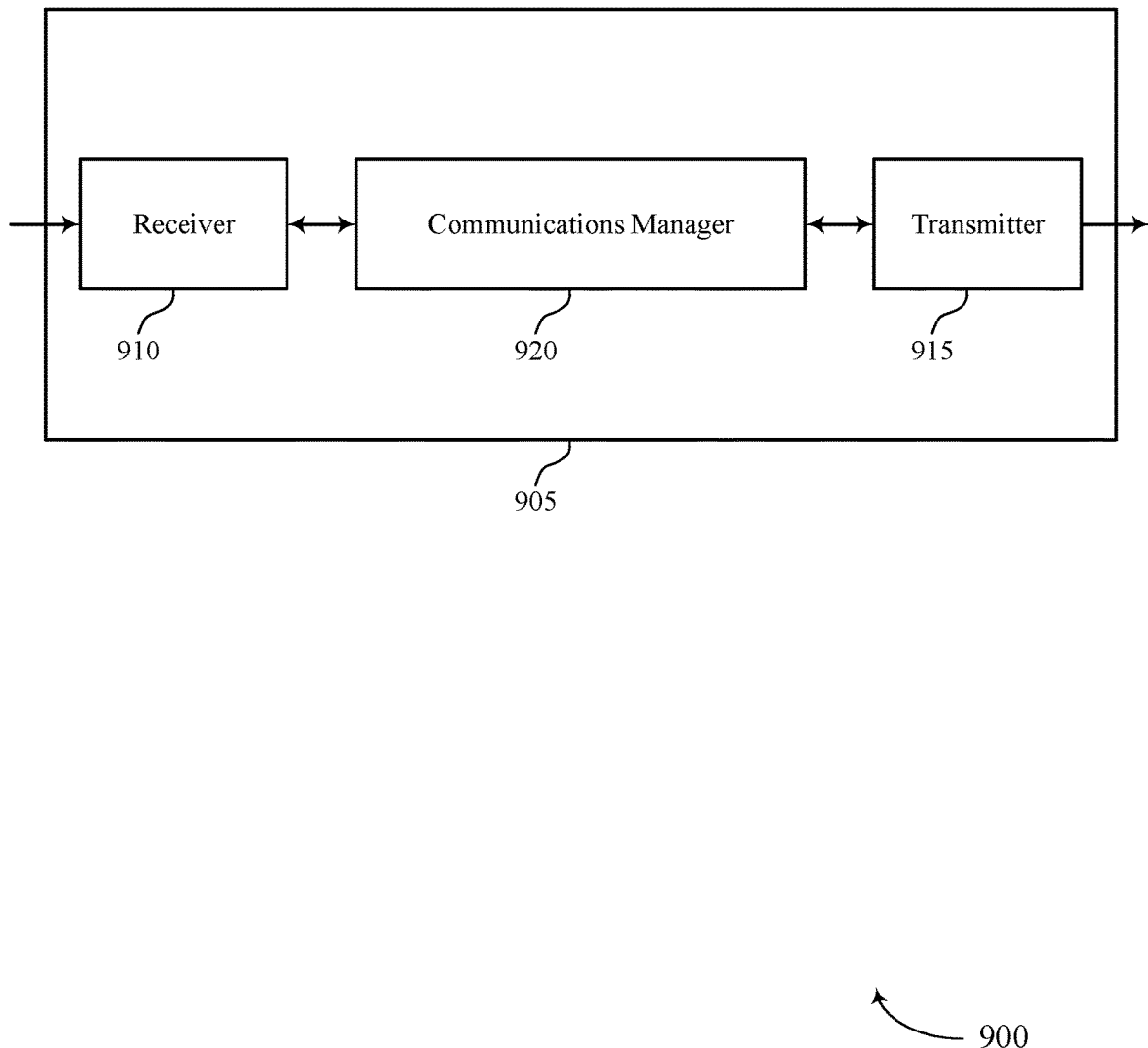
FIGS. 9 and 10 show block diagrams of devices that support spatial metric based mobility procedures using multi-port mobility reference signals in accordance with one or more aspects of the present disclosure.

FIG. 9 shows a block diagram 900 of a device 905 that supports spatial metric based mobility procedures using multi-port mobility reference signals in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of spatial metric based mobility procedures using multi-port mobility reference signals as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting a reference signal associated with a set of multiple antenna ports. The communications manager 920 may be configured as or otherwise support a means for receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The communications manager 920 may be configured as or otherwise support a means for transmitting a message that indicates one or more metrics associated with mobility management for a UE in communication with the network entity based on the report that indicates the channel measurement vector.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
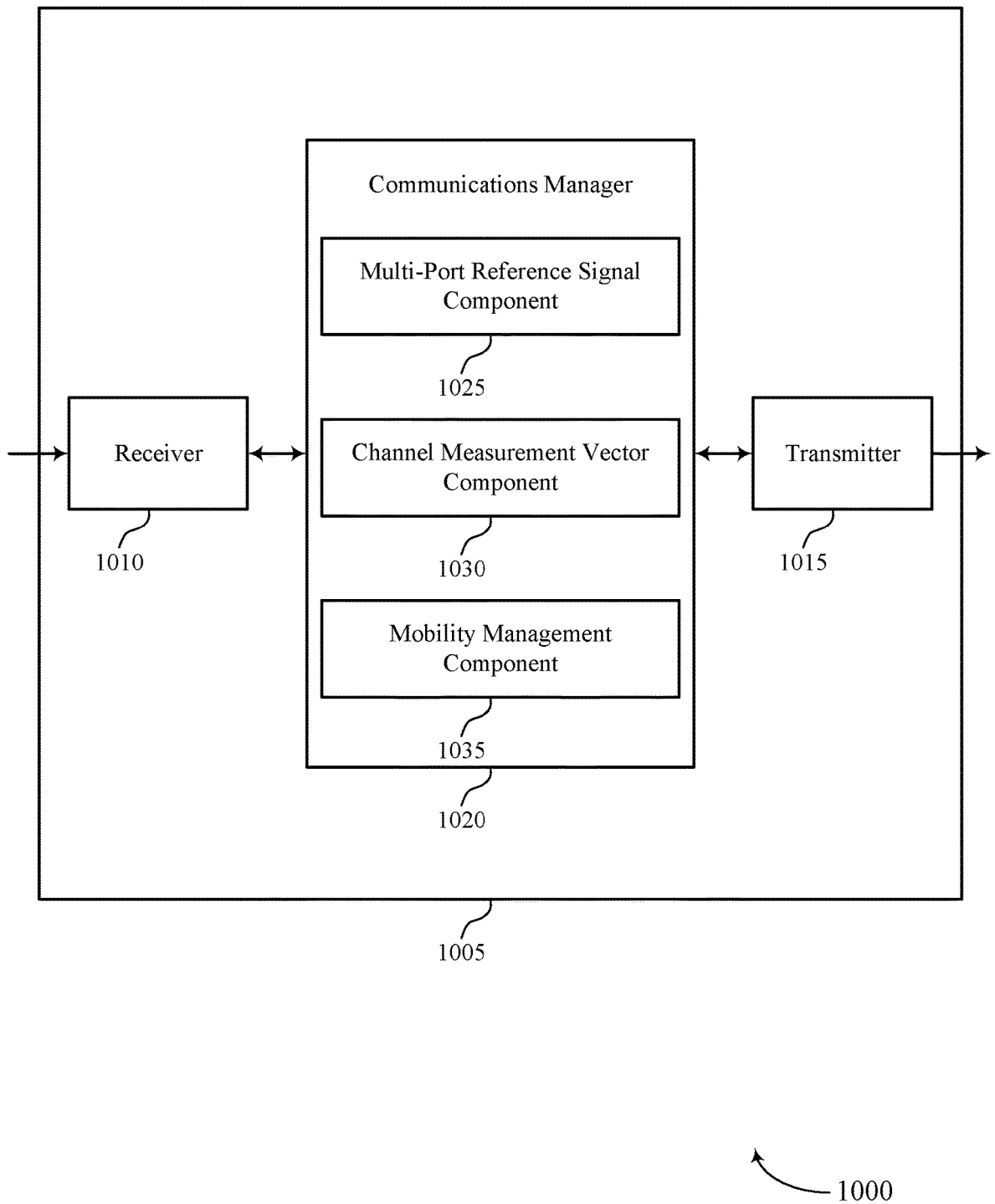

FIG. 10 shows a block diagram 1000 of a device 1005 that supports spatial metric based mobility procedures using multi-port mobility reference signals in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of spatial metric based mobility procedures using multi-port mobility reference signals as described herein. For example, the communications manager 1020 may include a multi-port reference signal component 1025, a channel measurement vector component 1030, a mobility management component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The multi-port reference signal component 1025 may be configured as or otherwise support a means for transmitting a reference signal associated with a set of multiple antenna ports. The channel measurement vector component 1030 may be configured as or otherwise support a means for receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The mobility management component 1035 may be configured as or otherwise support a means for transmitting a message that indicates one or more metrics associated with mobility management for a UE in communication with the network entity based on the report that indicates the channel measurement vector.

Figure 11:
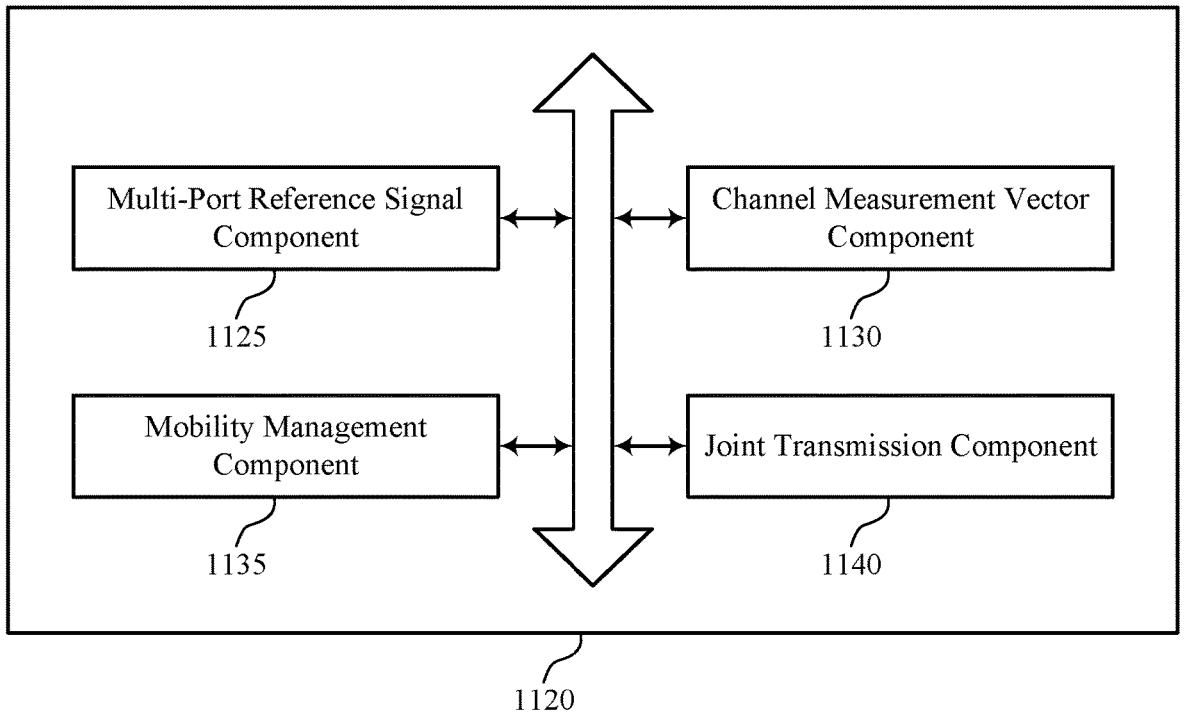
FIG. 11 shows a block diagram of a communications manager that supports spatial metric based mobility procedures using multi-port mobility reference signals in accordance with one or more aspects of the present disclosure.

FIG. 11 shows a block diagram 1100 of a communications manager 1120 that supports spatial metric based mobility procedures using multi-port mobility reference signals in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of spatial metric based mobility procedures using multi-port mobility reference signals as described herein. For example, the communications manager 1120 may include a multi-port reference signal component 1125, a channel measurement vector component 1130, a mobility management component 1135, a joint transmission component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The multi-port reference signal component 1125 may be configured as or otherwise support a means for transmitting a reference signal associated with a set of multiple antenna ports. The channel measurement vector component 1130 may be configured as or otherwise support a means for receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The mobility management component 1135 may be configured as or otherwise support a means for transmitting a message that indicates one or more metrics associated with mobility management for a UE in communication with the network entity based on the report that indicates the channel measurement vector.

In some examples, to support transmitting the reference signal, the multi-port reference signal component 1125 may be configured as or otherwise support a means for transmitting the reference signal from the set of multiple antenna ports of the network entity, the set of multiple antenna ports associated with a same cell ID and a same beam ID, where the channel measurement vector indicates the set of multiple measured channel metrics associated with the same cell ID and the same beam ID.

In some examples, to support transmitting the reference signal, the multi-port reference signal component 1125 may be configured as or otherwise support a means for transmitting the reference signal from the set of multiple antenna ports, the set of multiple antenna ports associated with two or more cell IDs, two or more beam IDs, or both, where the channel measurement vector indicates the set of multiple measured channel metrics associated with the two or more cell IDs, the two or more beam IDs, or both.

In some examples, the joint transmission component 1140 may be configured as or otherwise support a means for transmitting a signal that indicates the two or more cell IDs, the two or more beam IDs, or both support coherent joint transmissions or non-coherent joint transmissions for channel measurements.

In some examples, each measured channel metric of the set of multiple measured channel metrics in the channel measurement vector is associated with a respective antenna port of the set of multiple antenna ports. In some examples, each measured channel metric of the set of multiple measured channel metrics in the channel measurement vector is associated with a respective set of two or more antenna ports of the set of multiple antenna ports.

In some examples, to support transmitting the reference signal, the multi-port reference signal component 1125 may be configured as or otherwise support a means for transmitting, from the set of multiple antenna ports, the reference signal using FDM across a set of multiple frequency combs, TDM across a set of multiple symbols, delay domain multiplexing across a set of multiple cyclic shifts, CDM, or non-orthogonal code division multiplexing.

In some examples, the set of multiple measured channel metrics include signal strength metrics, spectral efficiency metrics, rank metrics, or any combination thereof. In some examples, the one or more metrics associated with the mobility management for the UE include a handover command for the UE.

Figure 12:
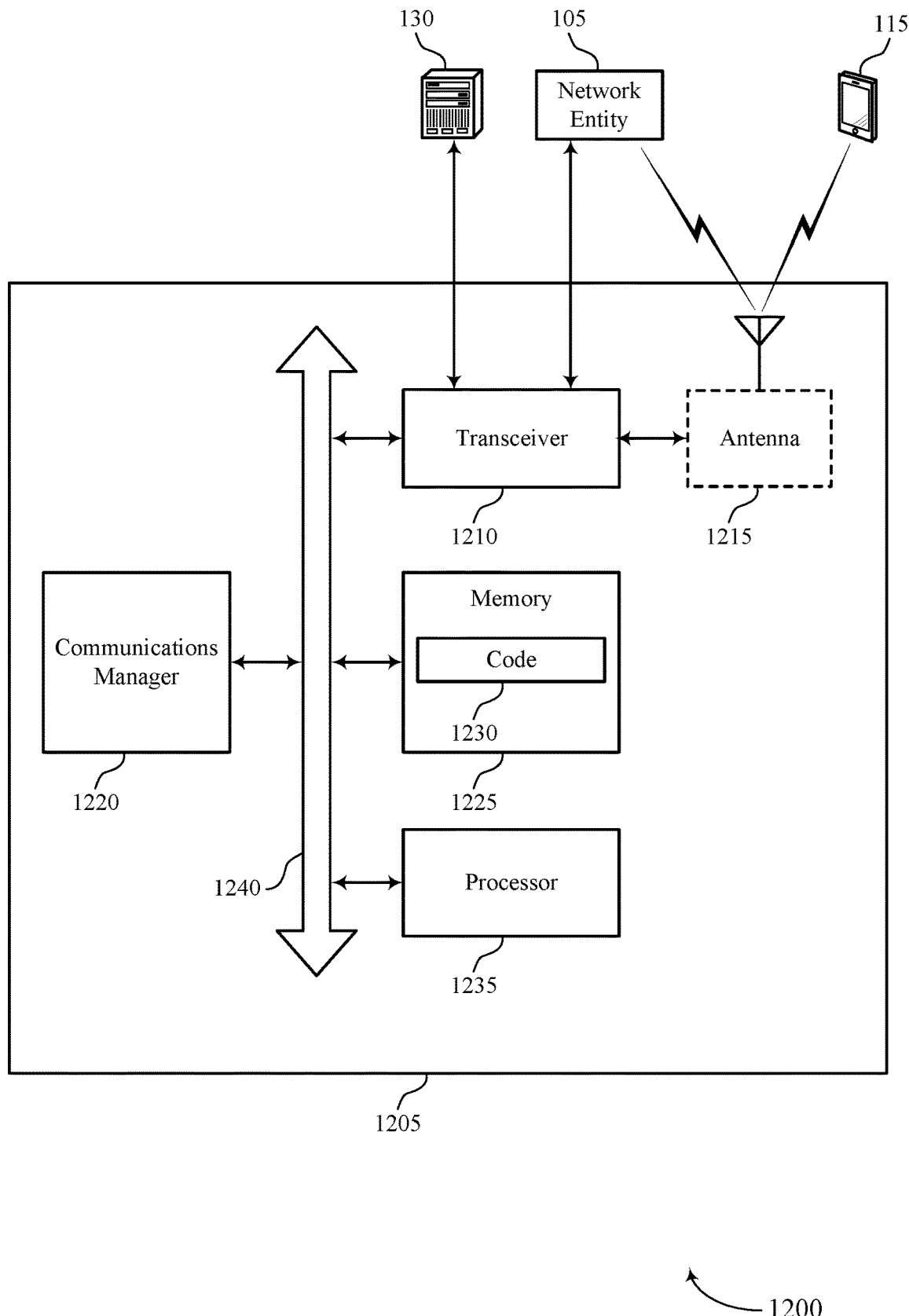
FIG. 12 shows a diagram of a system including a device that supports spatial metric based mobility procedures using multi-port mobility reference signals in accordance with one or more aspects of the present disclosure.

FIG. 12 shows a diagram of a system 1200 including a device 1205 that supports spatial metric based mobility procedures using multi-port mobility reference signals in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting spatial metric based mobility procedures using multi-port mobility reference signals). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with ULEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting a reference signal associated with a set of multiple antenna ports. The communications manager 1220 may be configured as or otherwise support a means for receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The communications manager 1220 may be configured as or otherwise support a means for transmitting a message that indicates one or more metrics associated with mobility management for a UE in communication with the network entity based on the report that indicates the channel measurement vector.

By including or configuring the communications manager 1220 in accordance with examples as described herein, the device 1205 may support techniques for improved communication reliability, reduced latency, reduced power consumption, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of spatial metric based mobility procedures using multi-port mobility reference signals as described herein, or the processor 1235 and the memory 1225 may be otherwise configured to perform or support such operations.

Figure 13:
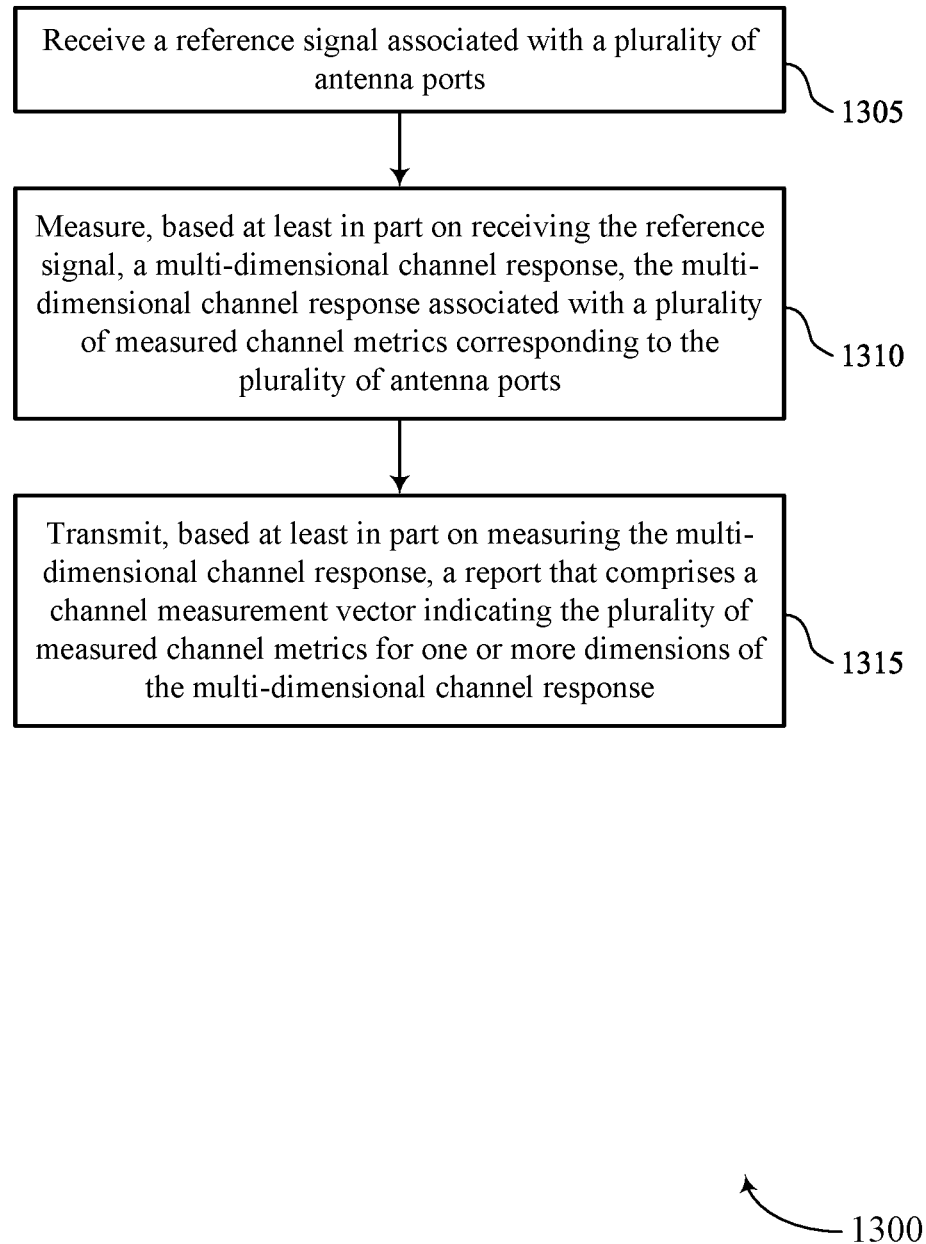
FIGS. 13 through 17 show flowcharts illustrating methods that support spatial metric based mobility procedures using multi-port mobility reference signals in accordance with one or more aspects of the present disclosure.

FIG. 13 shows a flowchart illustrating a method 1300 that supports spatial metric based mobility procedures using multi-port mobility reference signals in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a reference signal associated with a set of multiple antenna ports. The operations of 1305 may be performed in accordance with examples as disclosed herein. In some examples, aspects of the operations of 1305 may be performed by a multi-port reference signal component 725 as described with reference to FIG. 7.

At 1310, the method may include measuring, based on receiving the reference signal, a multi-dimensional channel response, the multi-dimensional channel response associated with a set of multiple measured channel metrics corresponding to the set of multiple antenna ports. The operations of 1310 may be performed in accordance with examples as disclosed herein. In some examples, aspects of the operations of 1310 may be performed by a multi-dimensional channel response component 730 as described with reference to FIG. 7.

At 1315, the method may include transmitting, based on measuring the multi-dimensional channel response, a report that includes a channel measurement vector indicating the set of multiple measured channel metrics for one or more dimensions of the multi-dimensional channel response. The operations of 1315 may be performed in accordance with examples as disclosed herein. In some examples, aspects of the operations of 1315 may be performed by a channel measurement vector component 735 as described with reference to FIG. 7.

Figure 14:
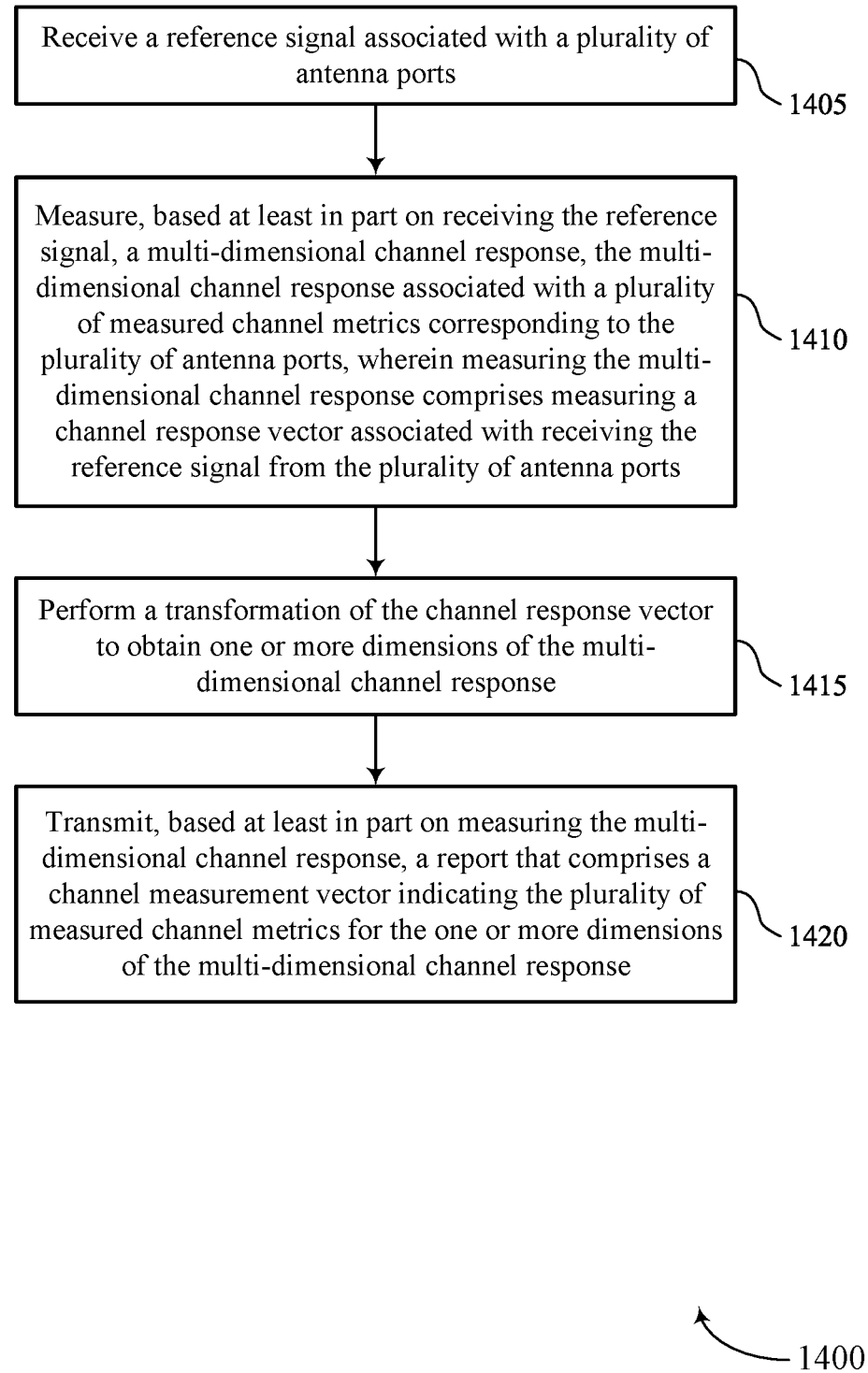

FIG. 14 shows a flowchart illustrating a method 1400 that supports spatial metric based mobility procedures using multi-port mobility reference signals in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a reference signal associated with a set of multiple antenna ports. The operations of 1405 may be performed in accordance with examples as disclosed herein. In some examples, aspects of the operations of 1405 may be performed by a multi-port reference signal component 725 as described with reference to FIG. 7.

At 1410, the method may include measuring, based on receiving the reference signal, a multi-dimensional channel response, the multi-dimensional channel response associated with a set of multiple measured channel metrics corresponding to the set of multiple antenna ports. In some examples, measuring the multi-dimensional channel response may include measuring a channel response vector associated with receiving the reference signal from the multiple antenna ports. The operations of 1410 may be performed in accordance with examples as disclosed herein. In some examples, aspects of the operations of 1410 may be performed by a multi-dimensional channel response component 730 as described with reference to FIG. 7.

At 1415, the method may include performing a transformation of the channel response vector to obtain the one or more dimensions of the multi-dimensional channel response. The operations of 1415 may be performed in accordance with examples as disclosed herein. In some examples, aspects of the operations of 1415 may be performed by a multi-dimensional channel response component 730 as described with reference to FIG. 7.

At 1420, the method may include transmitting, based on measuring the multi-dimensional channel response, a report that includes a channel measurement vector indicating the set of multiple measured channel metrics for one or more dimensions of the multi-dimensional channel response. The operations of 1420 may be performed in accordance with examples as disclosed herein. In some examples, aspects of the operations of 1420 may be performed by a channel measurement vector component 735 as described with reference to FIG. 7.

Figure 15:
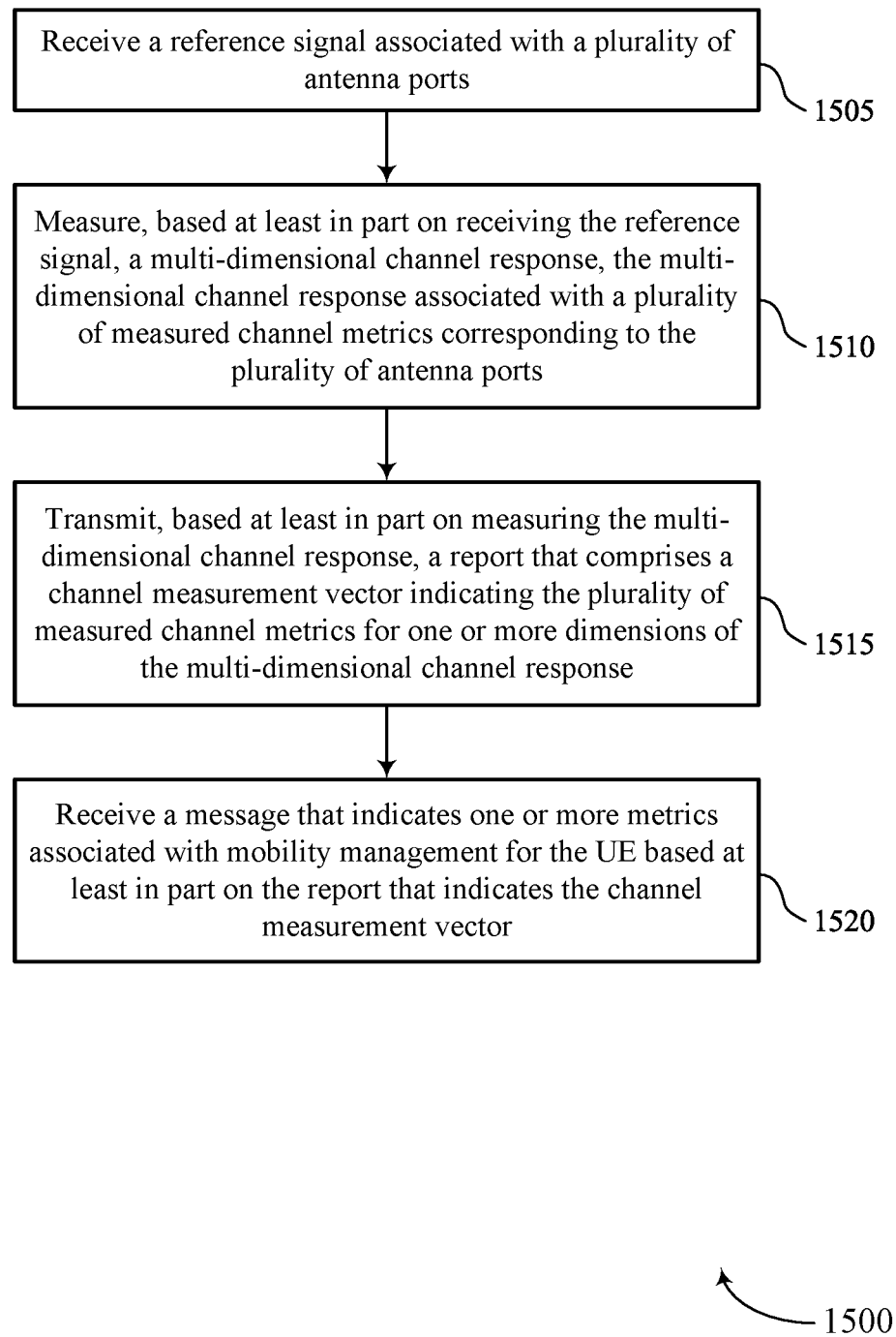

FIG. 15 shows a flowchart illustrating a method 1500 that supports spatial metric based mobility procedures using multi-port mobility reference signals in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a reference signal associated with a set of multiple antenna ports. The operations of 1505 may be performed in accordance with examples as disclosed herein. In some examples, aspects of the operations of 1505 may be performed by a multi-port reference signal component 725 as described with reference to FIG. 7.

At 1510, the method may include measuring, based on receiving the reference signal, a multi-dimensional channel response, the multi-dimensional channel response associated with a set of multiple measured channel metrics corresponding to the set of multiple antenna ports. The operations of 1510 may be performed in accordance with examples as disclosed herein. In some examples, aspects of the operations of 1510 may be performed by a multi-dimensional channel response component 730 as described with reference to FIG. 7.

At 1515, the method may include transmitting, based on measuring the multi-dimensional channel response, a report that includes a channel measurement vector indicating the set of multiple measured channel metrics for one or more dimensions of the multi-dimensional channel response. The operations of 1515 may be performed in accordance with examples as disclosed herein. In some examples, aspects of the operations of 1515 may be performed by a channel measurement vector component 735 as described with reference to FIG. 7.

At 1520, the method may include receiving a message that indicates one or more metrics associated with mobility management for the UE based on the report that indicates the channel measurement vector. The operations of 1520 may be performed in accordance with examples as disclosed herein. In some examples, aspects of the operations of 1520 may be performed by a mobility management component 740 as described with reference to FIG. 7.

Figure 16:
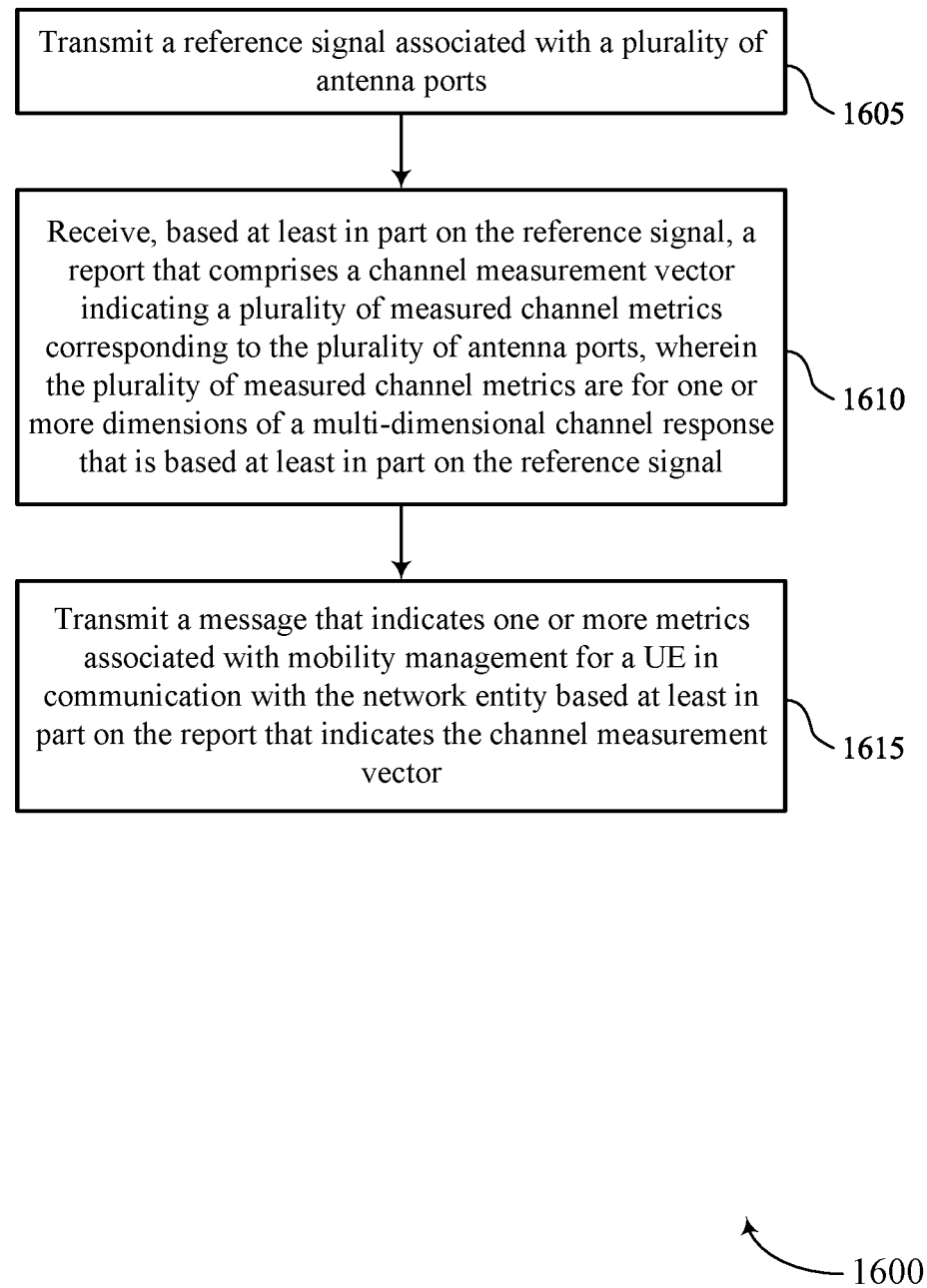

FIG. 16 shows a flowchart illustrating a method 1600 that supports spatial metric based mobility procedures using multi-port mobility reference signals in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a reference signal associated with a set of multiple antenna ports. The operations of 1605 may be performed in accordance with examples as disclosed herein. In some examples, aspects of the operations of 1605 may be performed by a multi-port reference signal component 1125 as described with reference to FIG. 11.

At 1610, the method may include receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The operations of 1610 may be performed in accordance with examples as disclosed herein. In some examples, aspects of the operations of 1610 may be performed by a channel measurement vector component 1130 as described with reference to FIG. 11.

At 1615, the method may include transmitting a message that indicates one or more metrics associated with mobility management for a UE in communication with the network entity based on the report that indicates the channel measurement vector. The operations of 1615 may be performed in accordance with examples as disclosed herein. In some examples, aspects of the operations of 1615 may be performed by a mobility management component 1135 as described with reference to FIG. 11.

Figure 17:
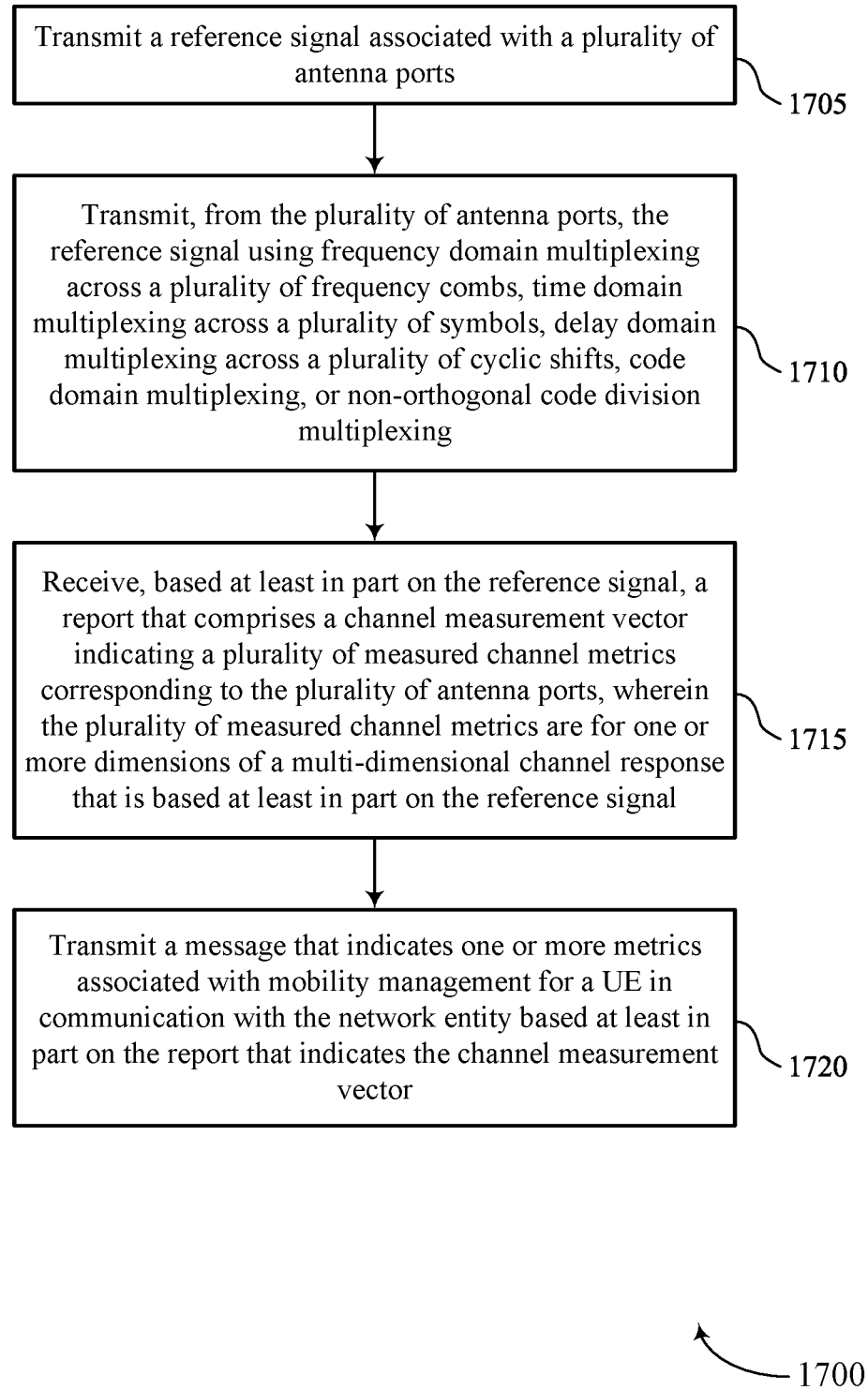

FIG. 17 shows a flowchart illustrating a method 1700 that supports spatial metric based mobility procedures using multi-port mobility reference signals in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a reference signal associated with a set of multiple antenna ports. The operations of 1705 may be performed in accordance with examples as disclosed herein. In some examples, aspects of the operations of 1705 may be performed by a multi-port reference signal component 1125 as described with reference to FIG. 11.

At 1710, the method may include transmitting, from the set of multiple antenna ports, the reference signal using FDM across a set of multiple frequency combs, TDM across a set of multiple symbols, delay domain multiplexing across a set of multiple cyclic shifts, CDM, or non-orthogonal code division multiplexing. The operations of 1710 may be performed in accordance with examples as disclosed herein. In some examples, aspects of the operations of 1710 may be performed by a multi-port reference signal component 1125 as described with reference to FIG. 11.

At 1715, the method may include receiving, based on the reference signal, a report that includes a channel measurement vector indicating a set of multiple measured channel metrics corresponding to the set of multiple antenna ports, where the set of multiple measured channel metrics are for one or more dimensions of a multi-dimensional channel response that is based on the reference signal. The operations of 1715 may be performed in accordance with examples as disclosed herein. In some examples, aspects of the operations of 1715 may be performed by a channel measurement vector component 1130 as described with reference to FIG. 11.

At 1720, the method may include transmitting a message that indicates one or more metrics associated with mobility management for a UE in communication with the network entity based on the report that indicates the channel measurement vector. The operations of 1720 may be performed in accordance with examples as disclosed herein. In some examples, aspects of the operations of 1720 may be performed by a mobility management component 1135 as described with reference to FIG. 11.

The following provides an overview of aspects of the present disclosure:

Aspect 1: A method for wireless communications at a UE, comprising: receiving a reference signal associated with a plurality of antenna ports; measuring, based at least in part on receiving the reference signal, a multi-dimensional channel response, the multi-dimensional channel response associated with a plurality of measured channel metrics corresponding to the plurality of antenna ports; and transmitting, based at least in part on measuring the multi-dimensional channel response, a report that comprises a channel measurement vector indicating the plurality of measured channel metrics for one or more dimensions of the multi-dimensional channel response.

Aspect 2: The method of aspect 1, wherein receiving the reference signal comprises: receiving the reference signal from the plurality of antenna ports associated with a same cell ID and a same beam ID, wherein the channel measurement vector indicates the plurality of measured channel metrics associated with the same cell ID and the same beam ID.

Aspect 3: The method of aspect 1, wherein receiving the reference signal comprises: receiving the reference signal from the plurality of antenna ports associated with two or more cell IDs, two or more beam IDs, or both, wherein the channel measurement vector indicates the plurality of measured channel metrics associated with the two or more cell IDs, the two or more beam IDs, or both.

Aspect 4: The method of aspect 3, wherein measuring the multi-dimensional channel response comprises: measuring a respective channel response associated with each of the two or more cell IDs, associated with each of the two or more beam IDs, or both; and concatenating the respective channel responses to obtain the multi-dimensional channel response.

Aspect 5: The method of any of aspects 3 through 4, further comprising: measuring the plurality of channel metrics based at least in part on the multi-dimensional channel response; and determining a subset of channel metrics of the plurality of channel metrics associated with a subset of the one or more dimensions of the multi-dimensional channel response, the subset of channel metrics associated with a greatest metric value, wherein the channel measurement vector comprises the subset of channel metrics based at least in part on the determining.

Aspect 6: The method of any of aspects 3 through 5, further comprising: receiving a signal that indicates the two or more cell IDs, the two or more beam IDs, or both support coherent joint transmissions or non-coherent joint transmissions for multi-port channel measurement.

Aspect 7: The method of any of aspects 3 through 5, further comprising: determining that the two or more cell IDs, the two or more beam IDs, or both support coherent joint transmissions or non-coherent joint transmissions for multi-port channel measurement based at least in part on values of the two or more cell IDs, the two or more beam IDs, or both.

Aspect 8: The method of any of aspects 3 through 5, further comprising: determining that the two or more cell IDs, the two or more beam IDs, or both support coherent joint transmissions or non-coherent joint transmissions for multi-port channel measurement based at least in part on a multiplexing mode associated with the reference signal.

Aspect 9: The method of any of aspects 1 through 8, wherein measuring the multi-dimensional channel response comprises: measuring a channel response vector associated with receiving the reference signal from the plurality of antenna ports; and performing a transformation of the channel response vector to obtain the one or more dimensions of the multi-dimensional channel response.

Aspect 10: The method of aspect 9, further comprising: determining whether the reference signal is associated with beamforming across one or more subsets of antenna ports of the plurality of antenna ports, wherein performing the transformation of the channel response vector is based at least in part on the determining.

Aspect 11: The method of any of aspects 9 through 10, further comprising: whitening the channel response vector based at least in part on an interference covariance structure, wherein the channel response vector is measured across multiple antennas that support with joint antenna processing.

Aspect 12: The method of any of aspects 9 through 11, further comprising: measuring the plurality of measured channel metrics based at least in part on decomposing the channel response vector into the one or more dimensions.

Aspect 13: The method of any of aspects 1 through 12, wherein each measured channel metric of the plurality of measured channel metrics in the channel measurement vector is associated with a respective antenna port of the plurality of antenna ports.

Aspect 14: The method of any of aspects 1 through 12, wherein each measured channel metric of the plurality of measured channel metrics in the channel measurement vector is associated with a respective set of two or more antenna ports of the plurality of antenna ports.

Aspect 15: The method of any of aspects 1 through 14, further comprising: receiving a message that indicates one or more metrics associated with mobility management for the UE based at least in part on the report that indicates the channel measurement vector.

Aspect 16: The method of any of aspects 1 through 14, further comprising: determining one or more metrics associated with mobility management for the UE based at least in part on the report that indicates the channel measurement vector.

Aspect 17: The method of any of aspects 1 through 16, wherein receiving the reference signal comprises: receiving the reference signal from the plurality of antenna ports based at least in part on FDM across a plurality of frequency combs, TDM across a plurality of symbols, delay domain multiplexing across a plurality of cyclic shifts, CDM, or non-orthogonal CDM.

Aspect 18: The method of any of aspects 1 through 17, wherein the plurality of measured channel metrics comprise signal strength metrics, spectral efficiency metrics, rank metrics, a set of antenna ports of the plurality of antenna ports that is associated with each of the plurality of measured channel metrics, or any combination thereof.

Aspect 19: The method of any of aspects 1 through 18, wherein the reference signal comprises an SSB, a TRS, or a CSI-RS.

Aspect 20: A method for wireless communications at a network entity, comprising: transmitting a reference signal associated with a plurality of antenna ports; receiving, based at least in part on the reference signal, a report that comprises a channel measurement vector indicating a plurality of measured channel metrics corresponding to the plurality of antenna ports, wherein the plurality of measured channel metrics are for one or more dimensions of a multi-dimensional channel response that is based at least in part on the reference signal; and transmitting a message that indicates one or more metrics associated with mobility management for a UE in communication with the network entity based at least in part on the report that indicates the channel measurement vector.

Aspect 21: The method of aspect 20, wherein transmitting the reference signal comprises: transmitting the reference signal from the plurality of antenna ports of the network entity, the plurality of antenna ports associated with a same cell ID and a same beam ID, wherein the channel measurement vector indicates the plurality of measured channel metrics associated with the same cell ID and the same beam ID.

Aspect 22: The method of aspect 20, wherein transmitting the reference signal comprises: transmitting the reference signal from the plurality of antenna ports, the plurality of antenna ports associated with two or more cell IDs, two or more beam IDs, or both, wherein the channel measurement vector indicates the plurality of measured channel metrics associated with the two or more cell IDs, the two or more beam IDs, or both.

Aspect 23: The method of aspect 22, further comprising: transmitting a signal that indicates the two or more cell IDs, the two or more beam IDs, or both support coherent joint transmissions or non-coherent joint transmissions for channel measurements.

Aspect 24: The method of any of aspects 20 through 23, wherein each measured channel metric of the plurality of measured channel metrics in the channel measurement vector is associated with a respective antenna port of the plurality of antenna ports.

Aspect 25: The method of any of aspects 20 through 23, wherein each measured channel metric of the plurality of measured channel metrics in the channel measurement vector is associated with a respective set of two or more antenna ports of the plurality of antenna ports.

Aspect 26: The method of any of aspects 20 through 25, wherein transmitting the reference signal comprises: transmitting, from the plurality of antenna ports, the reference signal using FDM across a plurality of frequency combs, TDM across a plurality of symbols, delay domain multiplexing across a plurality of cyclic shifts, CDM, or non-orthogonal CDM.

Aspect 27: The method of any of aspects 20 through 26, wherein the plurality of measured channel metrics comprise signal strength metrics, spectral efficiency metrics, rank metrics, or any combination thereof.

Aspect 28: The method of any of aspects 20 through 27, wherein the one or more metrics associated with the mobility management for the UE comprise a handover command for the UE.

Aspect 29: An apparatus for wireless communications at a UE, comprising a processor; memory coupled with the processor; and instructions stored in the memory and executable by the processor to cause the apparatus to perform a method of any of aspects 1 through 19.

Aspect 30: An apparatus for wireless communications at a UE, comprising at least one means for performing a method of any of aspects 1 through 19.

Aspect 31: A non-transitory computer-readable medium storing code for wireless communications at a UE, the code comprising instructions executable by a processor to perform a method of any of aspects 1 through 19.

Aspect 32: An apparatus for wireless communications at a network entity, comprising a processor; memory coupled with the processor; and instructions stored in the memory and executable by the processor to cause the apparatus to perform a method of any of aspects 20 through 28.

Aspect 33: An apparatus for wireless communications at a network entity, comprising at least one means for performing a method of any of aspects 20 through 28.

Aspect 34: A non-transitory computer-readable medium storing code for wireless communications at a network entity, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a reference signal associated with a plurality of antenna ports;
   measuring, based at least in part on receiving the reference signal, a multi-dimensional channel response, the multi-dimensional channel response associated with a plurality of measured channel metrics corresponding to the plurality of antenna ports; and
   transmitting, based at least in part on measuring the multi-dimensional channel response, a report that comprises a channel measurement vector indicating the plurality of measured channel metrics for one or more dimensions of the multi-dimensional channel response.

2. The method of claim 1, wherein receiving the reference signal comprises:
   receiving the reference signal from the plurality of antenna ports associated with a same cell identifier and a same beam identifier, wherein the channel measurement vector indicates the plurality of measured channel metrics associated with the same cell identifier and the same beam identifier.

3. The method of claim 1, wherein receiving the reference signal comprises:
   receiving the reference signal from the plurality of antenna ports associated with two or more cell identifiers, two or more beam identifiers, or both, wherein the channel measurement vector indicates the plurality of measured channel metrics associated with the two or more cell identifiers, the two or more beam identifiers, or both.

4. The method of claim 3, wherein measuring the multi-dimensional channel response comprises:
   measuring a respective channel response associated with each of the two or more cell identifiers, associated with each of the two or more beam identifiers, or both; and
   concatenating the respective channel responses to obtain the multi-dimensional channel response.

5. The method of claim 3, further comprising:
   measuring the plurality of channel metrics based at least in part on the multi-dimensional channel response; and determining a subset of channel metrics of the plurality of channel metrics associated with a subset of the one or more dimensions of the multi-dimensional channel response, the subset of channel metrics associated with a greatest metric value, wherein the channel measurement vector comprises the subset of channel metrics based at least in part on the determining.

6. The method of claim 3, further comprising:
receiving a signal that indicates the two or more cell identifiers, the two or more beam identifiers, or both support coherent joint transmissions or non-coherent joint transmissions for multi-port channel measurement.

7. The method of claim 3, further comprising:
determining that the two or more cell identifiers, the two or more beam identifiers, or both support coherent joint transmissions or non-coherent joint transmissions for multi-port channel measurement based at least in part on values of the two or more cell identifiers, the two or more beam identifiers, or both.

8. The method of claim 3, further comprising:
determining that the two or more cell identifiers, the two or more beam identifiers, or both support coherent joint transmissions or non-coherent joint transmissions for multi-port channel measurement based at least in part on a multiplexing mode associated with the reference signal.

9. The method of claim 1, wherein measuring the multi-dimensional channel response comprises:
measuring a channel response vector associated with receiving the reference signal from the plurality of antenna ports; and
performing a transformation of the channel response vector to obtain the one or more dimensions of the multi-dimensional channel response.

10. The method of claim 9, further comprising:
determining whether the reference signal is associated with beamforming across one or more subsets of antenna ports of the plurality of antenna ports, wherein performing the transformation of the channel response vector is based at least in part on the determining.

11. The method of claim 9, further comprising:
whitening the channel response vector based at least in part on an interference covariance structure, wherein the channel response vector is measured across multiple antennas that support with joint antenna processing.

12. The method of claim 9, further comprising:
measuring the plurality of measured channel metrics based at least in part on decomposing the channel response vector into the one or more dimensions.

13. The method of claim 1, wherein each measured channel metric of the plurality of measured channel metrics in the channel measurement vector is associated with a respective antenna port of the plurality of antenna ports.

14. The method of claim 1, wherein each measured channel metric of the plurality of measured channel metrics in the channel measurement vector is associated with a respective set of two or more antenna ports of the plurality of antenna ports.

15. The method of claim 1, further comprising:
receiving a message that indicates one or more metrics associated with mobility management for the UE based at least in part on the report that indicates the channel measurement vector.

16. The method of claim 1, further comprising:
determining one or more metrics associated with mobility management for the UE based at least in part on the report that indicates the channel measurement vector.

17. The method of claim 1, wherein receiving the reference signal comprises:
receiving the reference signal from the plurality of antenna ports based at least in part on frequency domain multiplexing across a plurality of frequency combs, time domain multiplexing across a plurality of symbols, delay domain multiplexing across a plurality of cyclic shifts, code domain multiplexing, or non-orthogonal code division multiplexing.

18. The method of claim 1, wherein the plurality of measured channel metrics comprise signal strength metrics, spectral efficiency metrics, rank metrics, a set of antenna ports of the plurality of antenna ports that is associated with each of the plurality of measured channel metrics, or any combination thereof.

19. The method of claim 1, wherein the reference signal comprises a synchronization signal block, a tracking reference signal, or a channel state information reference signal.

20. A method for wireless communications at a network entity, comprising:
transmitting a reference signal associated with a plurality of antenna ports;
receiving, based at least in part on the reference signal, a report that comprises a channel measurement vector indicating a plurality of measured channel metrics corresponding to the plurality of antenna ports, wherein the plurality of measured channel metrics are for one or more dimensions of a multi-dimensional channel response that is based at least in part on the reference signal; and
transmitting a message that indicates one or more metrics associated with mobility management for a user equipment (UE) in communication with the network entity based at least in part on the report that indicates the channel measurement vector.

21. The method of claim 20, wherein transmitting the reference signal comprises:
transmitting the reference signal from the plurality of antenna ports of the network entity, the plurality of antenna ports associated with a same cell identifier and a same beam identifier, wherein the channel measurement vector indicates the plurality of measured channel metrics associated with the same cell identifier and the same beam identifier.

22. The method of claim 20, wherein transmitting the reference signal comprises:
transmitting the reference signal from the plurality of antenna ports, the plurality of antenna ports associated with two or more cell identifiers, two or more beam identifiers, or both, wherein the channel measurement vector indicates the plurality of measured channel metrics associated with the two or more cell identifiers, the two or more beam identifiers, or both.

23. The method of claim 22, further comprising:
transmitting a signal that indicates the two or more cell identifiers, the two or more beam identifiers, or both support coherent joint transmissions or non-coherent joint transmissions for channel measurements.

24. The method of claim 20, wherein each measured channel metric of the plurality of measured channel metrics in the channel measurement vector is associated with a respective antenna port of the plurality of antenna ports.

25. The method of claim 20, wherein each measured channel metric of the plurality of measured channel metrics in the channel measurement vector is associated with a respective set of two or more antenna ports of the plurality of antenna ports.

26. The method of claim 20, wherein transmitting the reference signal comprises:
    transmitting, from the plurality of antenna ports, the reference signal using frequency domain multiplexing across a plurality of frequency combs, time domain multiplexing across a plurality of symbols, delay domain multiplexing across a plurality of cyclic shifts, code domain multiplexing, or non-orthogonal code division multiplexing.

27. The method of claim 20, wherein the plurality of measured channel metrics comprise signal strength metrics, spectral efficiency metrics, rank metrics, or any combination thereof.

28. The method of claim 20, wherein the one or more metrics associated with the mobility management for the UE comprise a handover command for the UE.

29. An apparatus for wireless communications at a user equipment (UE), comprising:
    a processor;
    memory coupled with the processor; and
    instructions stored in the memory and executable by the processor to cause the apparatus to:
        receive a reference signal associated with a plurality of antenna ports;
        measure, based at least in part on receiving the reference signal, a multi-dimensional channel response, the multi-dimensional channel response associated with a plurality of measured channel metrics corresponding to the plurality of antenna ports; and
        transmit, based at least in part on measuring the multi-dimensional channel response, a report that comprises a channel measurement vector indicating the plurality of measured channel metrics for one or more dimensions of the multi-dimensional channel response.

30. An apparatus for wireless communications at a network entity, comprising:
    a processor;
    memory coupled with the processor; and
    instructions stored in the memory and executable by the processor to cause the apparatus to:
        transmit a reference signal associated with a plurality of antenna ports;
        receive, based at least in part on the reference signal, a report that comprises a channel measurement vector indicating a plurality of measured channel metrics corresponding to the plurality of antenna ports, wherein the plurality of measured channel metrics are for one or more dimensions of a multi-dimensional channel response that is based at least in part on the reference signal; and
        transmit a message that indicates one or more metrics associated with mobility management for a user equipment (UE) in communication with the network entity based at least in part on the report that indicates the channel measurement vector.

* * * * *